(12) United States Patent
Nozue et al.

(10) Patent No.: US 10,427,576 B2
(45) Date of Patent: Oct. 1, 2019

(54) SEAT RECLINING APPARATUS

(71) Applicant: SHIROKI CORPORATION, Fujisawa-shi, Kanagawa (JP)

(72) Inventors: Norihisa Nozue, Fujisawa (JP); Hidehiko Fujioka, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 168 days.

(21) Appl. No.: 15/678,302

(22) Filed: Aug. 16, 2017

(65) Prior Publication Data
US 2018/0050616 A1  Feb. 22, 2018

(30) Foreign Application Priority Data

Aug. 18, 2016 (JP) ................................ 2016-160280

(51) Int. Cl.
*B60N 2/90* (2018.01)
*B60N 2/20* (2006.01)
*B60N 2/235* (2006.01)

(52) U.S. Cl.
CPC ............... *B60N 2/933* (2018.02); *B60N 2/20* (2013.01); *B60N 2/206* (2013.01); *B60N 2/2356* (2013.01); *B60N 2002/952* (2018.02)

(58) Field of Classification Search
CPC .......... B60N 2/206; B60N 2/20; B60N 2/933; B60N 2/2356; B60N 2002/952
USPC .................................................... 297/378.12
See application file for complete search history.

(56) References Cited

U.S. PATENT DOCUMENTS

| | | | |
|---|---|---|---|
| 6,550,864 B1 * | 4/2003 | Zarna | B60N 2/01583 297/378.12 |
| 6,739,668 B2 * | 5/2004 | Coman | B60N 2/206 297/378.12 |
| 2004/0021355 A1 | 2/2004 | Ohba | |
| 2007/0138854 A1 * | 6/2007 | Paing | B60N 2/20 297/378.12 |
| 2011/0148166 A1 * | 6/2011 | Bruck | B60N 2/753 297/354.1 |
| 2016/0016486 A1 * | 1/2016 | Aktas | B60N 2/12 297/378.12 |

FOREIGN PATENT DOCUMENTS

JP          2004-058928 A       2/2004

* cited by examiner

*Primary Examiner* — Milton Nelson, Jr.
(74) *Attorney, Agent, or Firm* — Buchanan, Ingersoll & Rooney PC

(57) ABSTRACT

A seat reclining apparatus includes a stopper which is movable between a forward-tilt restriction position to stop the seatback at an intermediate stop position in an unlock range, which is set in front of a lockable range in which a reclining mechanism of the seat reclining apparatus allows the angle of the seatback to be adjusted, and a restriction release position to allow the seatback to tilt forward beyond the intermediate stop position, and is situated at the forward-tilt restriction position when the seatback tilts toward the intermediate stop position from the lockable range. The seat reclining apparatus further includes a holding mechanism which keeps holding the stopper in the restriction release position until the seatback returns to the lockable range from a state where the seatback tilts forward beyond the intermediate stop position following a movement of the stopper from the forward-tilt restriction position to the restriction release position.

6 Claims, 18 Drawing Sheets

SEAT RECLINING APPARATUS

BACKGROUND OF THE INVENTION

1. Field of the Invention

The present invention relates to a seat reclining apparatus for a vehicle seat.

2. Description of the Related Art

A type of vehicle seat having a so-called walk-in function, which makes it easy for passengers to enter and exit to and from the rear seat, is known in the art. The walk-in function allows the seatback to tilt forward to a predetermined angle and also allows the entire seat to slide forward by unlocking the slide lock of the seat track. Another type of vehicle seat that can be adjusted to a folded-down (seatback folded-down) position, in which the seatback is tilted forward until the back surface of the seatback becomes substantially horizontal, is also known in the art. As a vehicle seat having these two functions: the walk-in function and the seat fold-down function, a vehicle seat equipped with a seat reclining apparatus is disclosed in Japanese Unexamined Patent Publication No. 2004-58928 (Patent Literature 1).

The vehicle seat disclosed in Patent Literature 1 is provided with a stopper disk that rotates integrally with the seatback and a stopper lever which can be manually operated independently of the seatback, and the stopper lever is biased to rotate in a direction to come in contact with the stopper disk. At the temporary stop position of the seatback which corresponds to a walk-in position during the walk-in operation, the seatback stops tilting by engagement of a stopper portion provided on the stopper disk with the stopper lever. When the seatback is brought to the folded-down position, the stopper lever is turned against the biasing force to release the engagement with the stopper portion. When the seatback is raised from the folded-down position, a circular arc portion of the stopper disk comes into contact with the stopper lever, which allows the seatback to be raised without making the stopper portion engage with stopper lever (i.e., without being interfered by the stopper lever).

In this type of vehicle seat, there is a possibility of various irregular operations in addition to normal operations being performed on the vehicle seat. For instance, when the seatback is brought to the folded-down position, it is conceivable that a foreign object may get caught in between the seatback and the seat cushion and then that the seatback may be temporarily raised halfway to remove the foreign object. In this case, according to the configuration disclosed in Patent Literature 1, the stopper lever returns to the position where it engages with the stopper portion of the stopper disk upon the seatback being raised to a position beyond the temporary stop position; therefore, to bring the seatback to the folded-down position again, it is required to perform an operation to again move the stopper lever to the disengaged position, in which the stopper lever is disengaged from the stopper portion of the stopper disk, which is troublesome.

SUMMARY OF THE INVENTION

An object of the present invention is to achieve an improvement in operability in a seat reclining apparatus for a vehicle seat which enables the seatback to tilt forward beyond the range of seating angle adjustment for the seatback and also enables the seatback to stop halfway at an intermediate stop position during the forward tilting operation.

According to an aspect of the present invention, a seat reclining apparatus for a reclining seat is provided, including a seat cushion and a seatback, wherein the seatback is supported to be capable of tilting forward and rearward relative to the seat cushion and has a moving range including: a lockable range, in which a reclining mechanism of the seat reclining apparatus, provided between the seat cushion and the seatback, operates to allow the angle of the seatback relative to the seat cushion to be adjusted; and an unlock range in front of the lockable range, in which a non-operating state of the reclining mechanism is maintained. The seat reclining apparatus includes a stopper which is movable between a forward-tilt restriction position to stop the seatback at an intermediate stop position in the unlock range and a restriction release position to allow the seatback to tilt forward beyond the intermediate stop position. The stopper is situated at the forward-tilt restriction position when the seatback tilts toward the intermediate stop position from the lockable range side, and is movable from the forward-tilt restriction position to the restriction release position in a state where the seatback stops at the intermediate stop position. The seat reclining apparatus further includes a holding mechanism which keeps holding the stopper in the restriction release position until the seatback returns to the lockable range from a state where the seatback tilts forward beyond the intermediate stop position following a movement of the stopper from the forward-tilt restriction position to the restriction release position.

It is desirable that the seat reclining apparatus be configured as follows. The stopper is biased toward the forward-tilt restriction position by a stopper biasing member. The holding mechanism includes a holding member which is movable between a first position and a second position, holds the stopper in the restriction release position when positioned in the first position, and allows the stopper to move to the forward-tilt restriction position when positioned in the second position. The holding member is biased toward the first position by a biasing member. The holding member is in the first position when the seatback is in the lockable range, and a pressing portion which moves with the seatback comes into contact with the holding member and moves the holding member from the first position to the second position in the middle of a tilting operation of the seatback from the lockable range to the intermediate stop position.

The seat reclining apparatus according to the present invention can be configured to operate in association with a slide-lock mechanism of a seat track (usually composed of a pair of lower rails and a pair of upper rails) that allows the reclining seat, which includes the seat cushion and the seatback, to slide in the forward and rearward directions. The slide-lock mechanism operates to switch between a slide-locked state, in which the slide-lock mechanism locks the seat track to prevent the reclining seat from sliding in the forward and rearward directions, and a slide allowing state, in which the slide-lock mechanism unlocks the seat track to allow the reclining seat to slide in the forward and rearward directions. The holding mechanism causes the slide lock mechanism to transition to the slide allowing state when the seatback tilts to the intermediate stop position from the lockable range. This makes it possible to turn the vehicle seat into a walk-in state (a state in which the seatback is positioned at the intermediate stop position and the entire seat is slidable forward) with a simple structure consisting of a small number of components.

Desirably, the seat reclining apparatus further includes a support member which is fixed to the seat cushion, and the stopper is supported by the support member to be rotatable about a rotational shaft parallel to the turning center of the seatback. Additionally, it is desirable for the stopper, in particular, to include: a held portion which comes into contact with the holding mechanism when held in the restriction release position; and a seatback stop portion which comes into contact with the seatback to stop the seatback at the intermediate stop position when positioned in the forward-tilt restriction position, wherein the held portion and the seatback stop portion are arranged in that order from the rotational shaft side.

The rotational shaft can be provided with a circular cross sectional portion which projects from the support member. In this case, it is advisable that the stopper be provided with a shaft hole into which the circular cross sectional portion of the rotational shaft is inserted, and that the shaft hole of the stopper be shaped into a noncircular hole the large diameter of which extends in a direction toward a position at which the seatback stop portion is provided. This structure allows the position of the stopper relative to the rotational shaft to be adjusted to thereby improve the positional accuracy of the seatback stop portion.

In the configuration in which the stopper is made as a rotatable member that can rotate relative to the support member, it is desirable for the holding member to be also made as a rotatable member. More specifically, the holding member is supported by the support member to be rotatable about a second rotational shaft parallel to the turning center of the seatback between the second position and a third position which is located on the opposite side of the first position from the second position. The held portion is formed to project from the stopper in a direction along the rotational shaft, and the holding member is provided with a recessed portion which is open in the rotational direction of the holding member about the second rotational shaft. An inner edge of the recessed portion is positioned on the rotational path of the held portion that is centered on the rotational shaft to hold the stopper in the restriction release position when the holding member is in one of the first position and the third position. The held portion is disengaged from the recessed portion to allow the stopper to rotate to the forward-tilt restriction position when the holding member is in the second position. Upon the seatback tilting forward beyond the intermediate stop position, the pressing portion is disengaged from the holding member to thereupon cause the holding member to rotate from the second position to the first position by the biasing force of the biasing member. When the seatback tilts to the lockable range from a position to which the seatback tilts forward beyond the intermediate stop position, the pressing portion comes into contact with and rotates the holding member from the first position to the third position, and is subsequently disengaged from the holding member to thereupon cause the holding member to rotate from the third position to the first position by the biasing force of the biasing member upon the seatback reaching the lockable range.

As described above, in a seat reclining apparatus according to the present invention, this apparatus is equipped the holding mechanism, which controls the operation of the stopper that stops the seatback at the intermediate stop position in front of the range of seating angle adjustment for the seatback; the holding mechanism is configured to keep holding the stopper in the restriction release position (a position not causing the seatback to stop tilting) until the seatback returns to the lockable range when the seatback tilts forward beyond the intermediate stop position. According to this configuration, even if such an operation as to temporarily raise the seatback halfway in the middle of the transition to the folded-down position, the seatback can be brought to the folded-down position again without causing the seatback stop at the intermediate stop position, which achieves an improvement in operability in the seat reclining apparatus.

The present disclosure relates to subject matter contained in Japanese Patent Application No. 2016-160280 (filed on Aug. 18, 2016) which is expressly incorporated herein by reference in its entirety.

BRIEF DESCRIPTION OF DRAWINGS

The present invention will be discussed below in detail with reference to the accompanying drawings, in which.

DESCRIPTION OF THE EMBODIMENT

Figure 1:
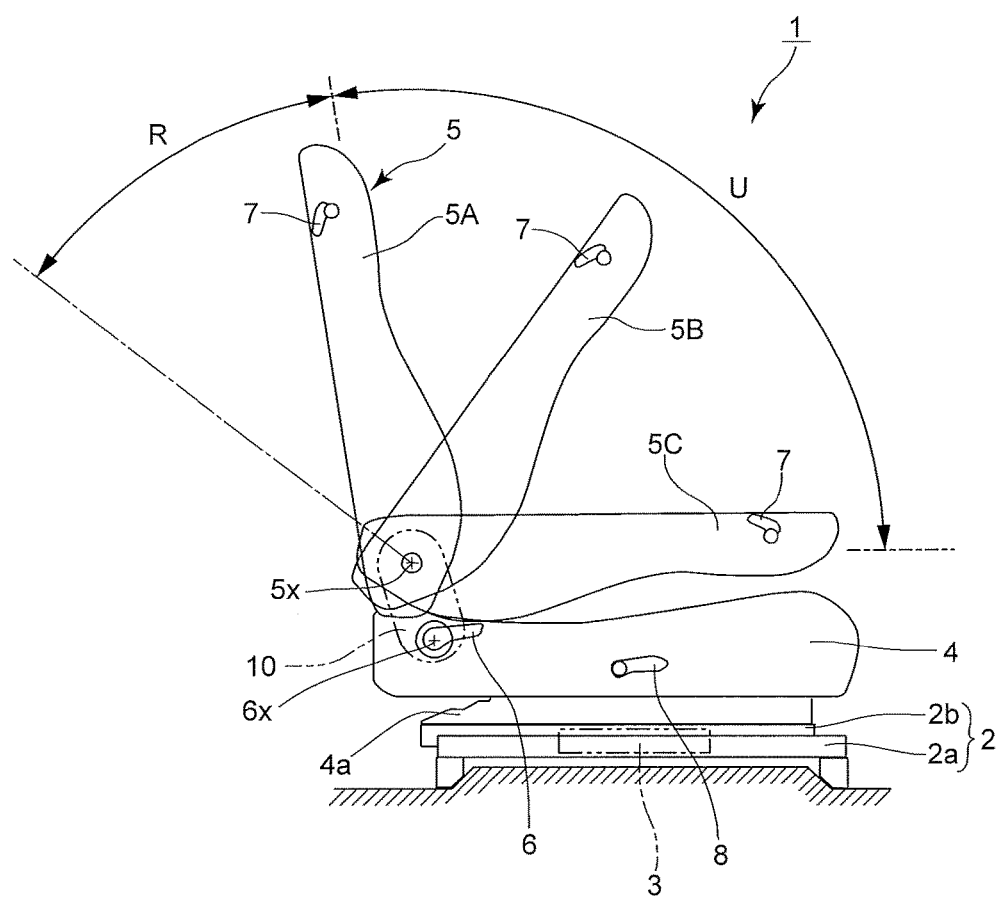
FIG. 1 is a side elevational view of a vehicle seat equipped with a seat reclining apparatus according to the present invention.

A vehicle seat (reclining seat) 1 shown in FIG. 1 is supported to be movable in the forward and rearward directions of a vehicle (not shown) via a seat track 2. The seat track 2 is provided with two sets of rails: a pair of lower rails 2a (only one of which can be seen in FIG. 1) that are fixed to a vehicle floor and a pair of upper rails 2b (only one of which can be seen in FIG. 1) that are slidable in the forward and rearward directions relative to the pair of lower rails 2a. With a slide-lock mechanism 3 that is conceptually shown in FIG. 1, the pair of upper rails 2b can be brought into the following two states: a slide-locked state in which the pair of upper rails 2b is prevented from sliding relative to the pair of lower rails 2a and a slide allowing state in which the pair of upper rails 2b is allowed to slide relative to the pair of lower rails 2a. A known slide-lock mechanism can be adopted as the slide-lock mechanism 3, so that the detailed description of the slide-lock mechanism 3 will be omitted. The vehicle seat 1 is biased to slide forward by a seat slide spring (not shown).

The vehicle seat 1 is provided with a seat cushion 4 having a seating surface on top and a seatback 5. A seat cushion frame 4a (partly shown in FIG. 1) as a component of the seat cushion 4 is fixedly supported on the pair of upper rails 2b. The seatback 5 is pivotally supported by a portion of the seat cushion 4 in the vicinity of the rear end thereof to be tiltable (rotatable) in the forward and rearward directions about a rotation center (turning center/axis of rotation) 5x via a seat reclining apparatus 10 which will be discussed later. FIG. 1 schematically shows the rotation center 5x, about which the seatback 5 rotates (tilts). In the reclining range (lockable range) R of the seatback 5 that is shown in FIG. 1, the seatback 4 can be held at an arbitrary angle (reclining lock operation can be performed) by the operation of each reclining lock mechanism (reclining mechanism) 14 and 71 which will be discussed in detail later. The position of the seatback 5 in the reclining range R at which the reclining angle of the seatback 5 is the smallest (at which the seatback 5 stands in upright position) refers to an initial lock position 5A. The seat reclining apparatus 10 biases the seatback 5 in a direction to tilt the seat back 5 forward (in the clockwise direction with respect to FIG. 1). On unlocking each reclining lock mechanism 14 and 71, the seatback 5 tilts forward beyond the initial lock position 5A. The tilting range of the seatback 5 which is set from the initial lock position 5A forward is set as an unlock range U in which a non-operating state of each reclining lock mechanism 14 and 71 is maintained (in which each reclining lock mechanism 14 and 71 does not lock the seatback 5).

As shown in FIG. 1, the vehicle seat 10 is provided on a side of the seat cushion 4 with a lock release handle (seat recline lever) 6 which can be manually rotated about a rotation center 6x positioned below the rotation center 5x of the seatback 5. The seatback 5 is provided on a side thereof with a walk-in lever 7. In addition, the seat cushion 4 is provided, on a side thereof at a different position from the lock release handle 6, with a seatback fold-down lever 8. The seatback 5 can be tilted forward to an intermediate stop position 5B (shown in FIG. 1) in the unlock range U by releasing each reclining lock mechanism 14 and 71 by manually operating the lock release handle 6 and the walk-in lever 7. Additionally, by manually operating the seatback fold-down lever 8, the seatback 5 can be tilted further forward to a folded-down position 5C (shown in FIG. 1) at which the back surface of the seatback 5 becomes substantially horizontal. The operations of the seatback 5 to the above described positions will be discussed in detail later.

The details of the seat reclining apparatus 10 will be hereinafter discussed with reference to FIG. 2 onward. A pair of seat reclining apparatuses are provided on one and the other sides of the vehicle seat 1 in the widthwise direction thereof; accordingly, the seat reclining apparatus 10 shown in the drawings is one of the two seat reclining apparatuses (specifically, the right-side seat reclining apparatus for the vehicle seat 1 shown in FIG. 1 with respect to the direction in which the vehicle is headed). The term "seat inner side" in the following description of the vehicle seat 1 corresponds to the side close to the center of the vehicle seat 1 in the widthwise direction thereof and the term "seat outer side" in the following description of the vehicle seat 1 corresponds to the side far from the center of the vehicle seat 1 in the widthwise direction thereof (the right-hand side of the vehicle seat 1 shown in FIG. 1). FIGS. 5, 7, 9 and 11 are side elevational views of the seat reclining apparatus 10 in different states, viewed from the seat outer side and FIGS. 6, 8, 10 and 12 are side elevational views of the seat reclining apparatus 10 in different states, viewed from the seat inner side. The plan views of the components (an open plate 20, a first lever 21, a second lever 30, a cancel lever 31, a support guide plate 41 and a handle fastening member 42) of the seat reclining apparatus 10 shown in FIGS. 14, 15, 16, 17, 19 and 20, respectively, are those viewed from the seat inner side, i.e., from the opposite side (the seat outer side) from which the same components are viewed in FIGS. 5, 7, 9 and 11.

Figure 2:
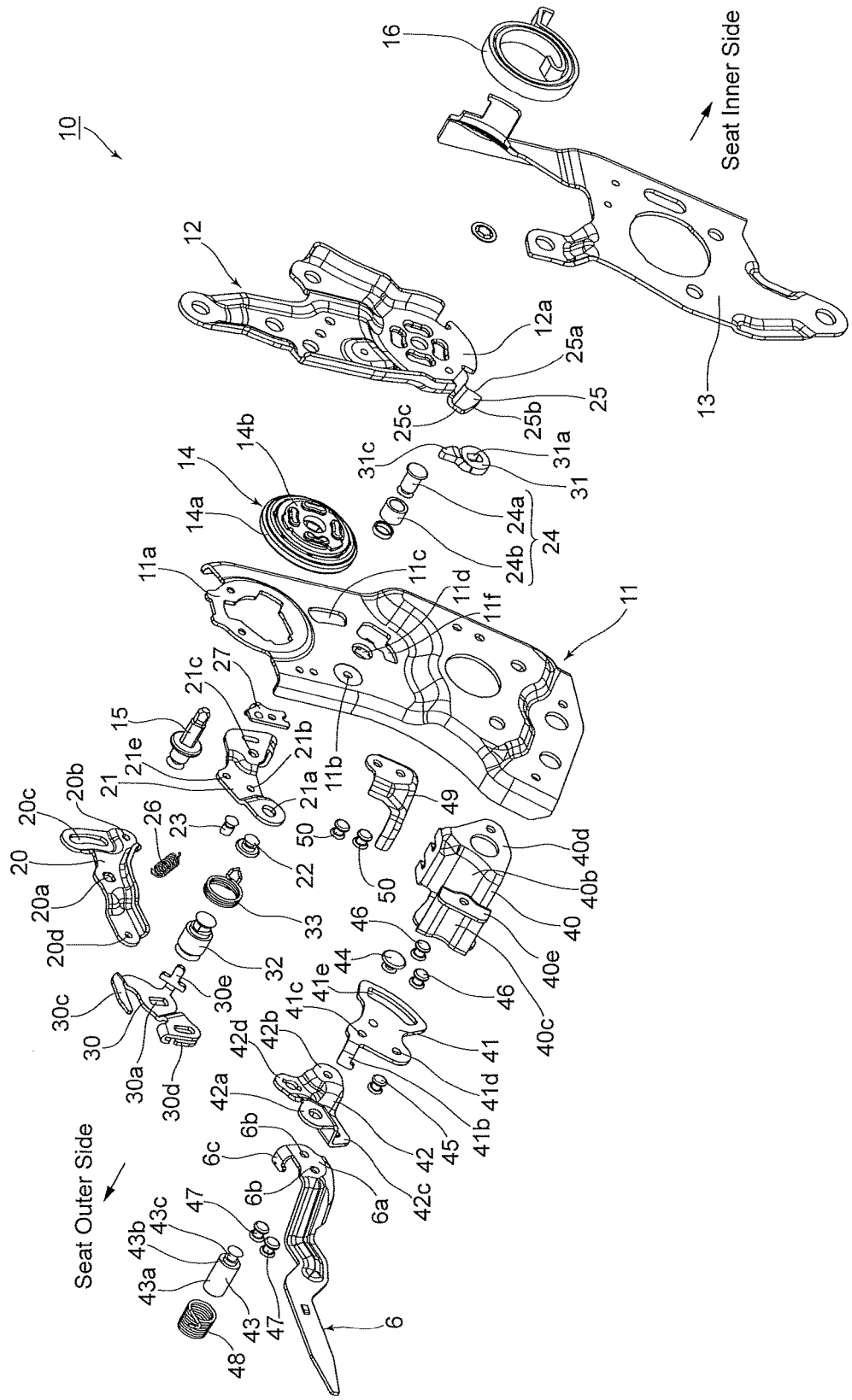
FIG. 2 is an exploded perspective view of the seat reclining apparatus provided on one side of the vehicle seat.

As shown in FIG. 2, the seat reclining apparatus 10 is provided with a lower bracket (support member) 11 which is fixedly supported by the seat cushion 4 and an upper bracket 12 which is fixedly supported by the seatback 5. The lower bracket 11 is fixed to a portion of the seat cushion frame 4a (see FIG. 1) in the vicinity of the rear end thereof via a support plate 13 (see FIGS. 2 and 3). The reclining lock mechanism 14 is provided between the lower bracket 11 and the upper bracket 12. The reclining lock mechanism 14 is a round type of reclining lock mechanism the structure of which is known in the art, and thus will be briefly described hereinafter.

The reclining lock mechanism 14 is provided with a base plate 14a and a ratchet plate 14b, which are combined to be rotatable relative to each other. The lower bracket 11 is provided in the vicinity of the upper end thereof with a fastening portion 11a, and the base plate 14a is fixed to the fastening portion 11a by welding. The upper bracket 12 is provided in the vicinity of the lower end thereof with a fastening portion 12a, and the ratchet plate 14b is fixed to the fastening portion 12a by welding. The rotation center of the relative rotation between the base plate 14a and the ratchet plate 14b is coincident with the rotation center 5x of the seatback 5, which is shown in FIG. 1. A plurality of lock members (not shown), which are allowed to move in radial directions centered on the rotation center 5x, and a cam member (not shown) which rotates about the rotation center 5x are arranged between the base plate 14a and the ratchet plate 14b. Each lock member is prevented from moving relative to the base plate 14a in the rotational direction thereof, and the cam member rotates integrally with a hinge pin 15 (on the rotation center 5x) that is inserted into the centers of the base plate 14a and the ratchet plate 14b.

Variation of the position of the cam member in the rotational direction thereof causes the radial position of each lock member to vary. Upon each lock member moving radially outward, the radially outer teeth formed on each lock member meshes with the radially inner teeth formed on the ratchet plate 14b, which prevents the base plate 14a and the ratchet plate 14b from rotating relative to each other. The cam member is biased in the locking direction to bring the radially outer teeth of each lock member into mesh with the radially inner teeth of the ratchet plate 14b by lock springs (not shown) installed in the reclining lock mechanism 14. Therefore, unless operated from the outside, the reclining lock mechanism 14 maintains a locked state thereof, in which the upper bracket 12 is prevented from tilting relative to the lower bracket 11.

The upper bracket 12, which is fixed to the seatback 5, is biased in a forward-tilt direction (toward the intermediate stop position 5B and the folded-down position 5C) by a forward-tilt biasing spring 16 (shown in FIG. 2). The forward-tilt biasing spring 16 is a spiral torsion spring one end and the other end of which are engaged with the upper bracket 12 and the support bracket 13, respectively.

Figure 14:
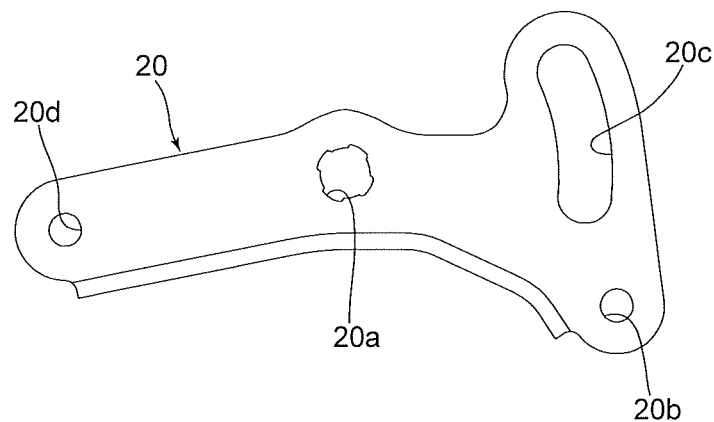
FIG. 14 is a plan view of an open plate as a part of the seat reclining apparatus, viewed from the seat inner side.

The seat reclining apparatus 10 is provided on the seat outer side of the lower bracket 11 with the open plate 20, which rotates integrally with the hinge pin 15. As shown in FIGS. 2 and 14, the open plate 20 is provided with a noncircular hole 20a in the vicinity of its center in the longitudinal direction thereof. The open plate 20 is further provided, in the vicinity of one end (the right end with respect to FIG. 14) in the longitudinal direction thereof, with a cable connection hole 20b and a circular arc hole 20c, and provided, in the vicinity of the other end (the left end with respect to FIG. 14) in the longitudinal direction thereof, with a cable connection hole 20d. The hinge pin 15 and the open plate 20 are joined to each other to rotate integrally by insertion of a noncircular cross-sectional portion formed on the hinge pin 15 into the noncircular hole 20a. The circular arc hole 20c is an elongated hole which is elongated in the circumferential direction about the axis of the hinge pin 15 (i.e., about the rotation center 5x) inserted into the noncircular hole 20a. The biasing force of the aforementioned lock springs (not shown) installed in the reclining lock mechanism 14 acts on the open plate 20 via the hinge pin 15 to bias the open plate 20 in the clockwise direction with respect to FIGS. 5, 7, 9 and 11 (i.e., in the counterclockwise direction with respect to FIG. 14) to hold the open plate 20 in a lock position (shown in FIGS. 5, 9 and 11). The open plate 20 is rotatable from the lock position to a lock release position (shown in FIG. 7) against the biasing force of the lock springs.

Figure 15:
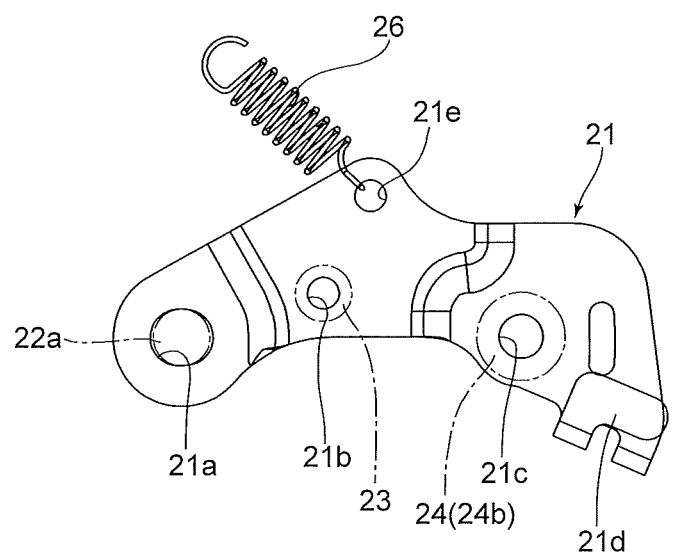
FIG. 15 is a plan view of a first lever as a part of the seat reclining apparatus, viewed from the seat inner side.

The seat reclining apparatus 10 is provided, on the seat outer side of the lower bracket 11 at a position below the open plate 20, with the first lever (stopper) 21. The first lever 21 is supported to the lower bracket 11 via a shaft member (rotational shaft) 22 to be rotatable about the shaft member 22. As shown in FIGS. 2 and 15, the first lever 21 is provided, in the vicinity of one end (the left end with respect to FIG. 15) in the longitudinal direction thereof, with a shaft hole (noncircular hole) 21a, and further provided, at positions substantially aligned in a radial direction centered on the shaft hole 21a, with a pin support hole 21b, a pin support hole 21c and a cable connection portion 21d, in that order from the shaft hole 21a side. In addition, the first lever 21 is provided with a spring hook hole 21e.

The shaft member 22 (see FIG. 2) is inserted (partly fitted) into the shaft hole 21a of the first lever 21. The lower bracket 11 is provided with a shaft bearing hole 11b (see FIG. 2), and the shaft member 22 is inserted into the shaft bearing hole 11b to be fixedly supported by the lower bracket 11. The axis of the shaft member 22 is substantially parallel to the rotation center 5x of the seatback 5, and the first lever 21 is supported on the shaft member 22 to be rotatable about the shaft member 22. As shown in FIG. 15, the portion of the shaft member 22 which is inserted (fitted) into the shaft hole 21a is formed as a circular cross-sectional portion 22a, whereas the shaft hole 21a is in the shape of an oval, specifically the shape of a circle slightly stretched (elongated), so that the large diameter of the shaft hole 21a is slightly greater than the diameter of the circular cross-sectional portion 22a of the shaft member 22. The direction of the large diameter of the shaft hole 21a, which substantially corresponds to the horizontal direction with respect to FIG. 15, extends roughly in the direction in which the pin support hole 21b, the pin support hole 21c and the cable connection portion 21d are aligned. More specifically, the pin support hole 21c is positioned on a straight line extended from the axis of the shaft hole 21a in the direction of elongation thereof, which allows the positional error in the position at which the first lever 21 is supported with respect to the lower bracket 11 to be absorbed (adjusted) along the direction of elongation of the shaft hole 21a. However, the clearance between the shaft hole 21a and the shaft member 22 is extremely small to a degree that does not cause the first lever 21 to rattle or produce noise.

The seat reclining apparatus 10 is provided with a link pin (held portion) 23 which is inserted into the pin support hole 21b of the first lever 21 to be supported thereby so that the link pin 23 projects toward the seat outer side. The seat reclining apparatus 10 is provided with a stopper pin (seatback stop portion) 24 which is inserted into the pin support hole 21c to be supported thereby so that the stopper pin 24 projects toward the seat inner side. The link pin 23 is a columnar projection having a cylindrical outer peripheral surface. The stopper pin 24 consists of a shaft portion 24a and an outer cylinder 24b. The shaft portion 24a is inserted into the pin support hole 21c of the first lever 21 to be supported thereby. The outer cylinder 24b is fitted on the outer periphery of the shaft portion 24a to be rotatably supported thereon. The outer cylinder 24b is cylindrical in shape greater in diameter than the link pin 23. The stopper pin 24 projects toward the seat inner side from the lower bracket 11 through a circular arc hole 11c which is formed in the lower bracket 11 (see FIGS. 6, 8, 10 and 12). In FIG. 15, outer peripheral surfaces of the link pin 23 and the stopper pin 24 that are attached to the first lever 21 are imaginarily shown by one-dot chain lines. The circular arc hole 11c is an elongated hole which is elongated in the circumferential direction about the circular cross-sectional portion 22a (see FIG. 15) of the shaft member 22, which is inserted into the shaft bearing hole 11b of the lower bracket 11 and supported thereby.

The upper bracket 12 is provided in the vicinity of the lower end thereof with a control projection (pressing portion) 25. As shown in FIGS. 6, 8, 10 and 12, the control projection 25 is located at a position decentered from the rotation center 5x of the seatback 5. The control projection 25 is provided with a first pressing surface 25a, a second pressing surface 25b and a peripheral curved surface 25c. The first pressing surface 25a faces in one rotational direction (specifically the counterclockwise direction with respect to FIGS. 6, 8, 10 and 12) about the rotation center 5x, the second pressing surface 25b faces in the other rotational direction (i.e., the clockwise direction with respect to FIGS. 6, 8, 10 and 12) about the rotation center 5x, and the peripheral curved surface 25c connects the first pressing surface 25a and the second pressing surface 25b. The first pressing surface 25a is a flat surface which extends in a radial direction centered substantially on the rotation center 5x. The second pressing surface 25b is a flat surface which has a given degree of inclination with respect to the first pressing surface 25a. The inclination direction of the second pressing surface 25b is such that the distance from the second pressing surface 25b to the first pressing surface 25a decreases in a direction toward the end (radially outer end) of the control projection 25 away from the rotation center 5x of the seatback 5. The peripheral curved surface 25c, which is the outer end surface of the control projection 25, is a curved surface which extends in the circumferential direction about the rotation center 5x of the seatback 5.

Figure 5:
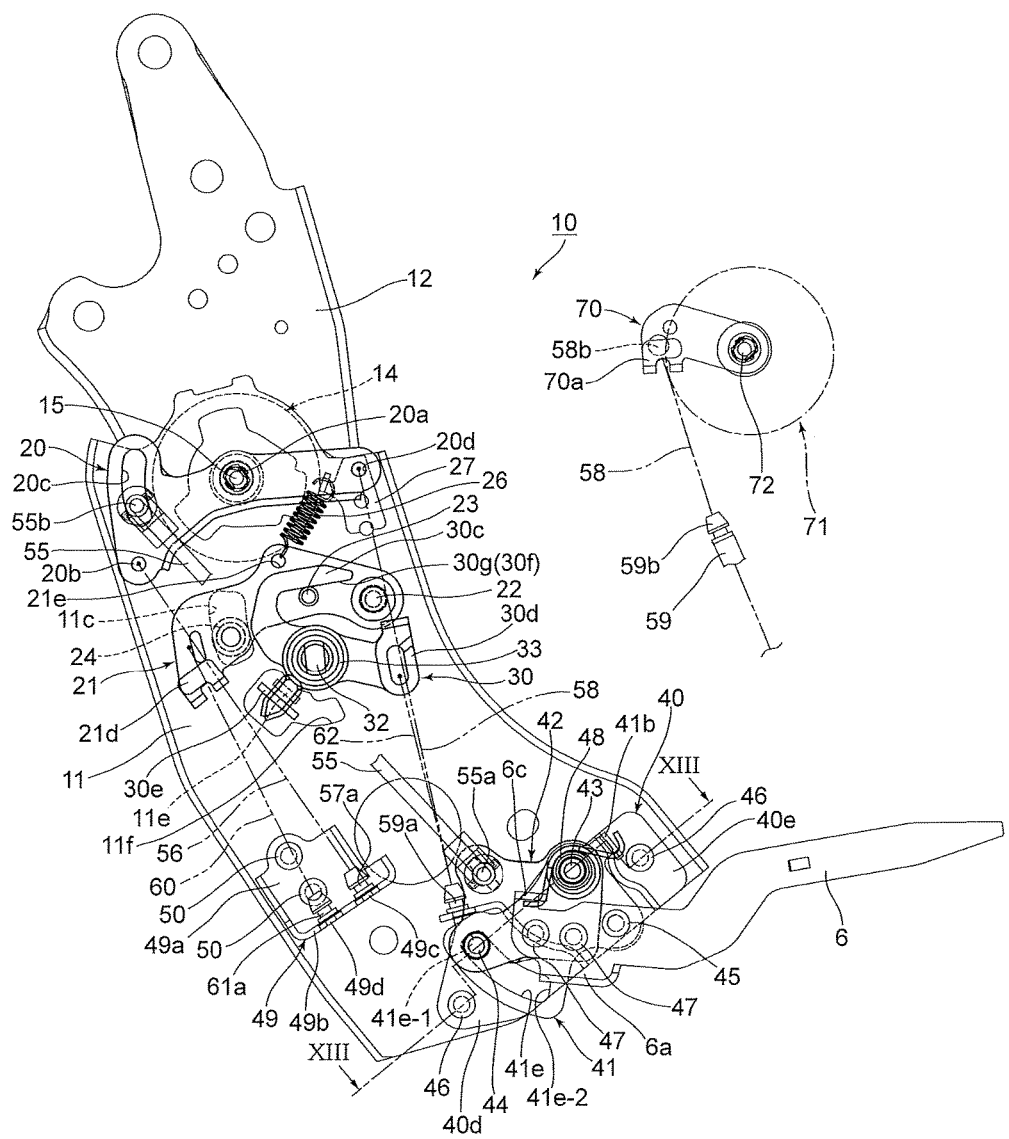
FIG. 5 is a side elevational view of the seat reclining apparatus in a state where the seatback is in the reclining range, viewed from the seat outer side.
Figure 6:
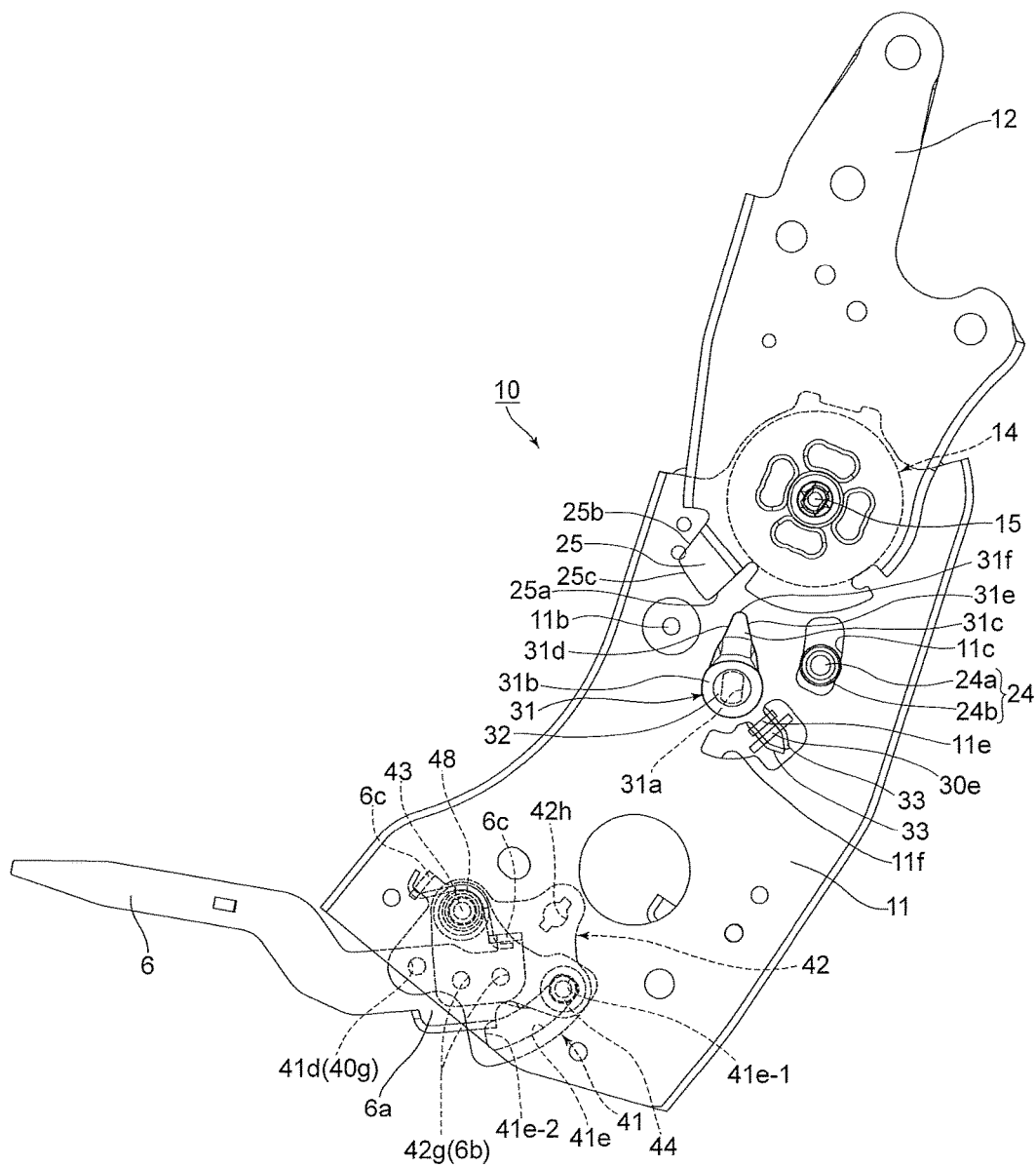
FIG. 6 is a side elevational view of the seat reclining apparatus in a state where the seatback is in the reclining range, viewed from the seat inner side.
Figure 7:
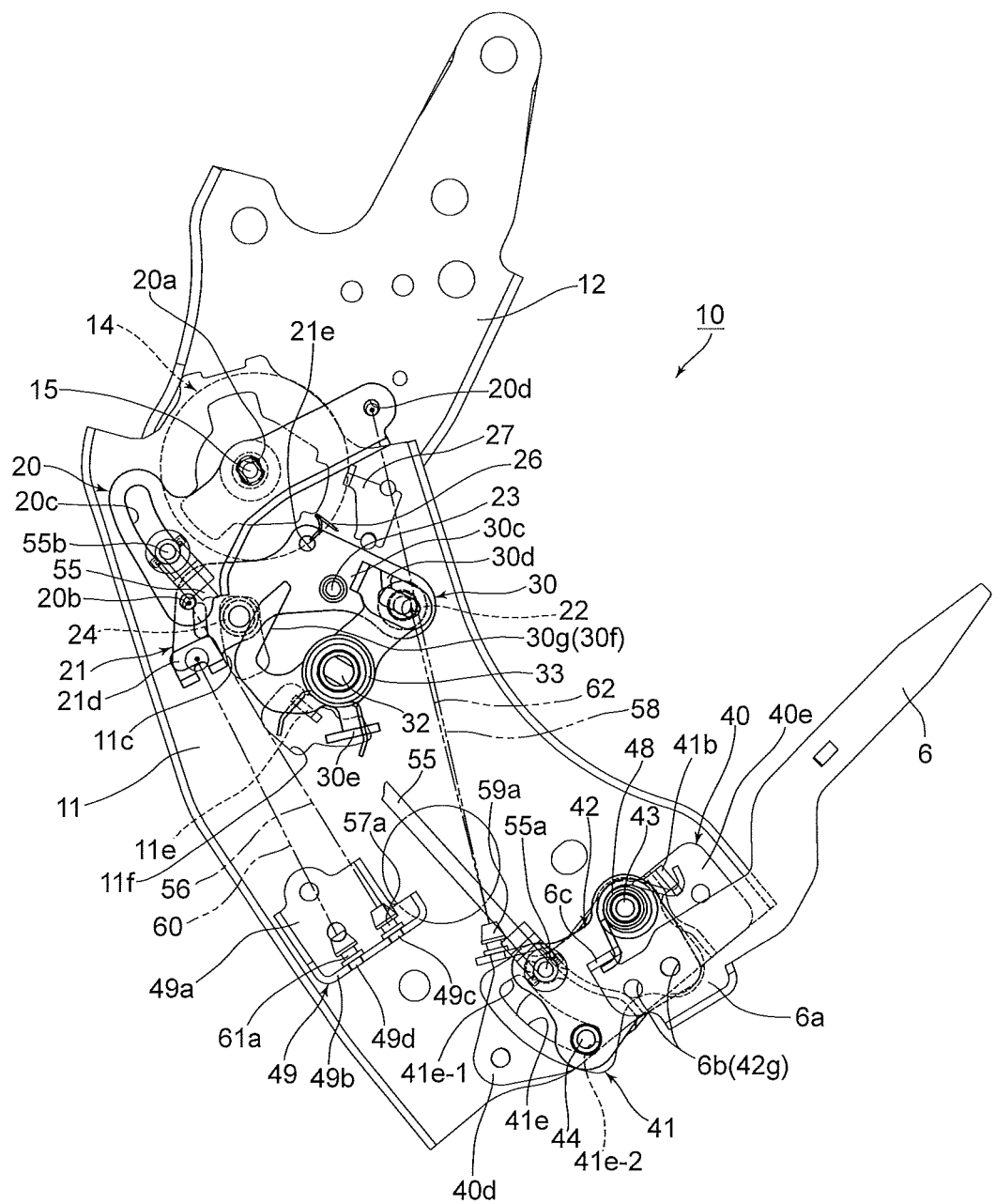
FIG. 7 is a side elevational view of the seat reclining apparatus in a state where the seatback is at an intermediate stop position, viewed from the seat outer side.
Figure 8:
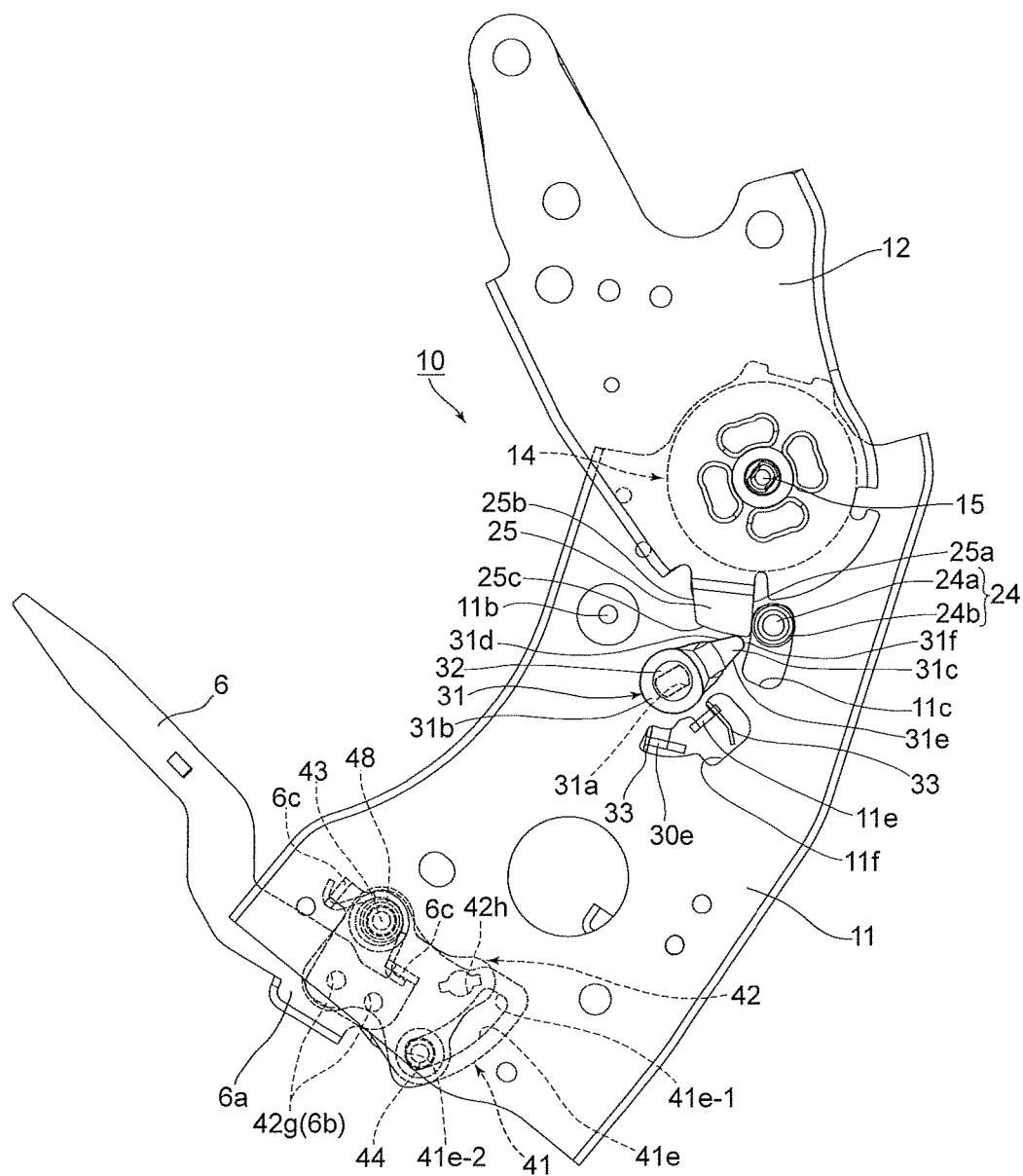
FIG. 8 is a side elevational view of the seat reclining apparatus in a state where the seatback is at the intermediate stop position, viewed from the seat inner side.
Figure 9:
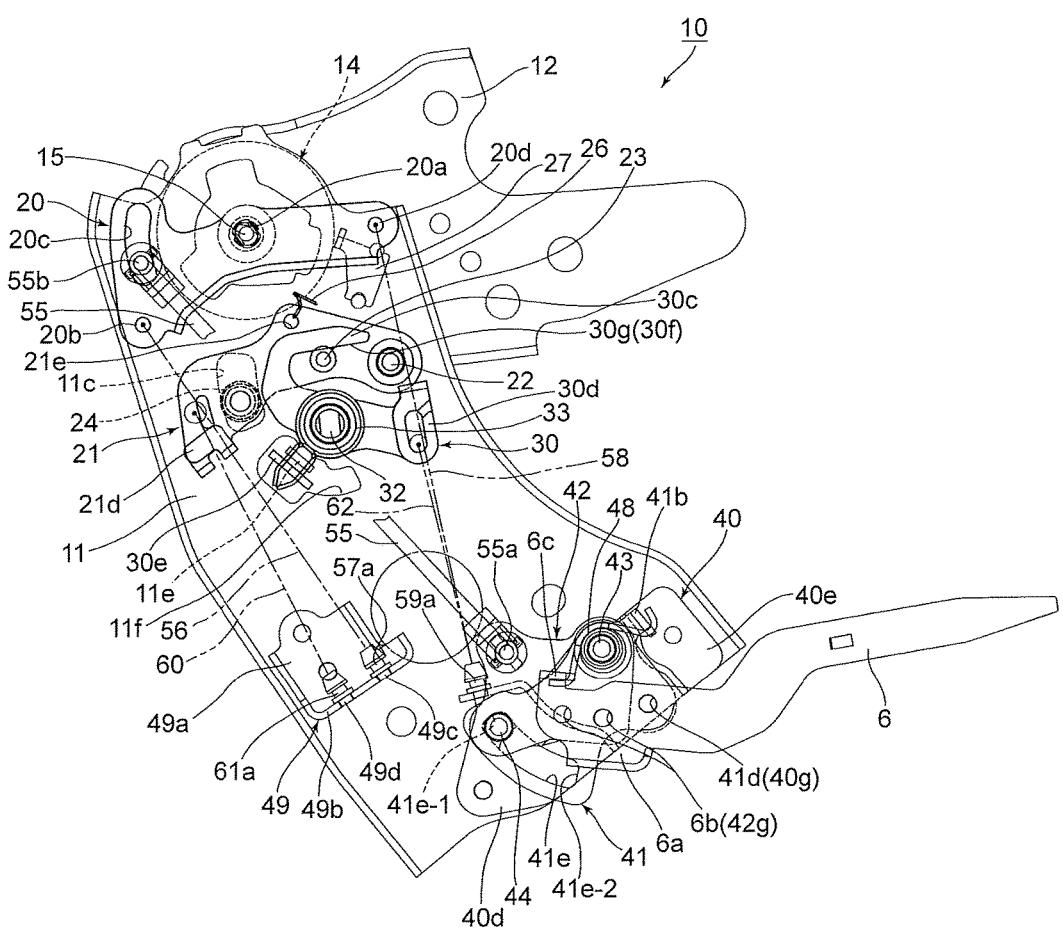
FIG. 9 is a side elevational view of the seat reclining apparatus in a state where the seatback is in a folded-down position, viewed from the seat outer side.
Figure 10:
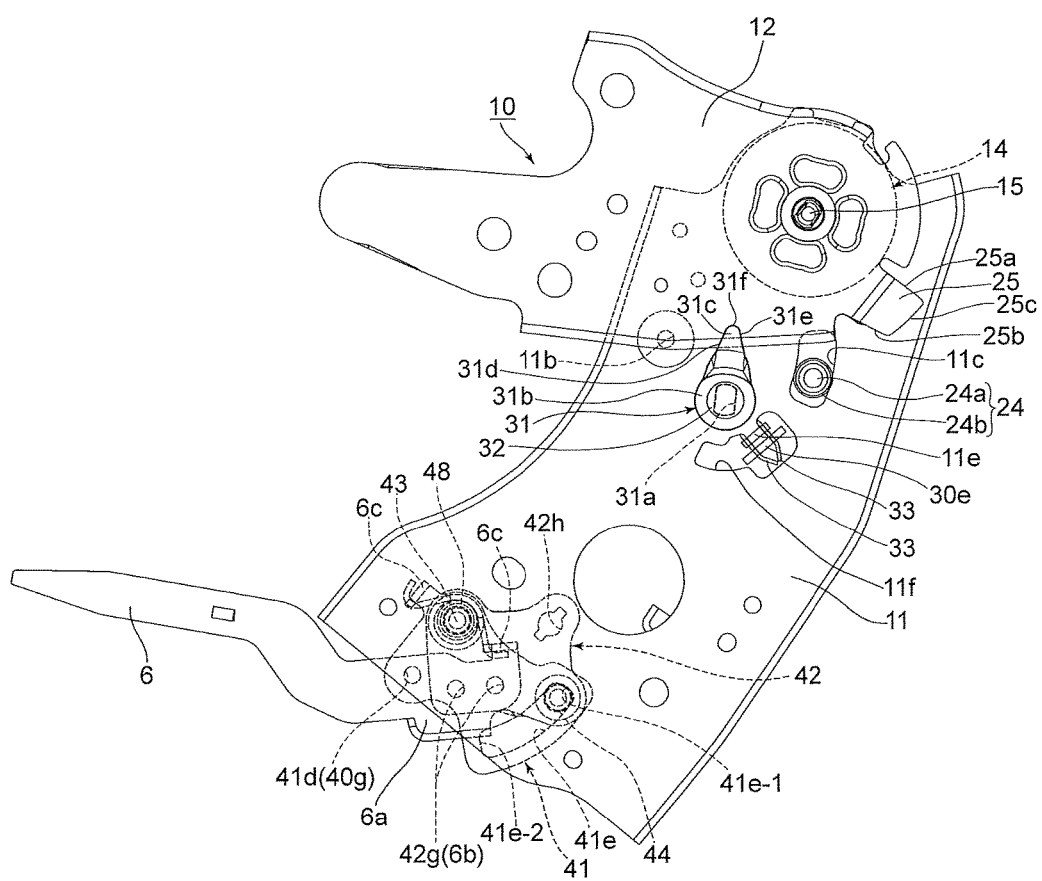
FIG. 10 is a side elevational view of the seat reclining apparatus in a state where the seatback is in the folded-down position, viewed from the seat inner side.
Figure 11:
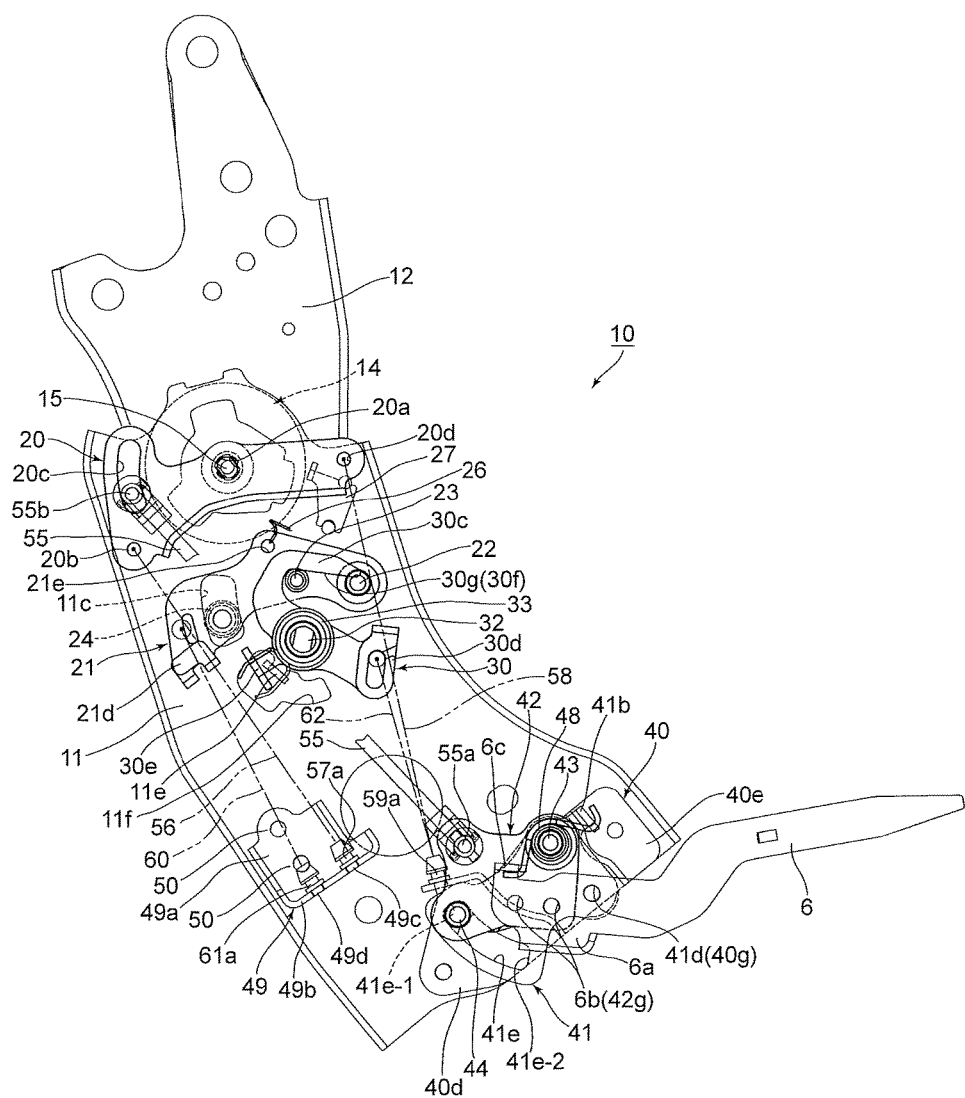
FIG. 11 is a side elevational view of the seat reclining apparatus in a state where the seatback has been tilted (raised) to a point immediately in front of the reclining range from the folded-down position, viewed from the seat outer side.
Figure 12:
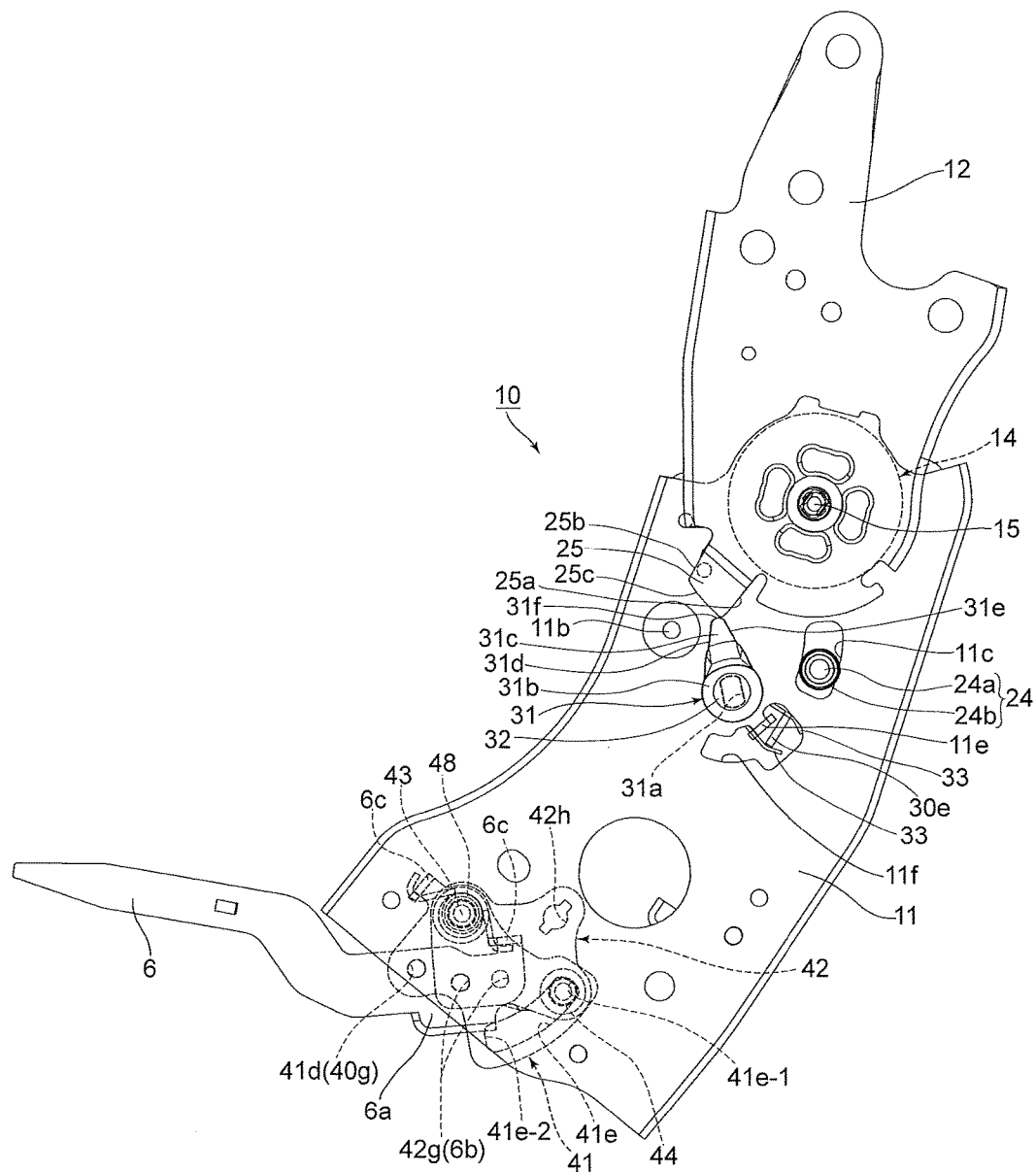
FIG. 12 is a side elevational view of the seat reclining apparatus in a state where the seatback has been tilted (raised) to a point immediately in front of the reclining range from the folded-down position, viewed from the seat inner side.

Swinging (rotating) about the shaft member 22 causes the first lever 21 to move between a forward-tilt restriction position (shown in FIG. 7), in which the stopper pin 24 advances onto the movement path of the control projection 25 of the upper bracket 12 (the rotational path of the control projection 25 about the rotation center 5x) as shown in FIG. 8, and a restriction release position (FIGS. 5, 9 and 11), in which the stopper pin 24 retreats downward from the movement path of the control projection 25 of the upper bracket 12 as shown in FIGS. 6, 10 and 12. The first lever 21 is biased in a direction toward the forward-tilt restriction position (the clockwise direction with respect to FIGS. 5, 7, 9 and 11, or the counterclockwise direction with respect to FIG. 15) by an extension coil spring (stopper biasing member) 26 (see FIG. 15) one end and the other end of which are hooked onto the spring hook hole 21e and a spring hook piece 27 (see FIGS. 2 and 3) which is fixed onto the lower bracket 11. As shown in FIG. 8, the moving end of the first lever 21 in the biasing direction of the extension coil spring 26 (i.e., the forward-tilt restriction position of the first lever 21) is determined by contact of the stopper pin 24 (the outer cylinder 24b) with the upper end of the circular arc hole 11c of the lower bracket 11.

The second lever (an element of a holding mechanism/a holding member) 30 and the cancel lever (an element of the holding mechanism/a holding member) 31 are supported by the lower bracket 11 at positions below the first lever 21 via a shaft member (second rotational shaft) 32 to be rotatable about the shaft member 32. The second lever 30 is positioned on the seat outer side with respect to the lower bracket 11 and the cancel lever 31 is positioned on the seat inner side with respect to the lower bracket 11.

Figure 16:
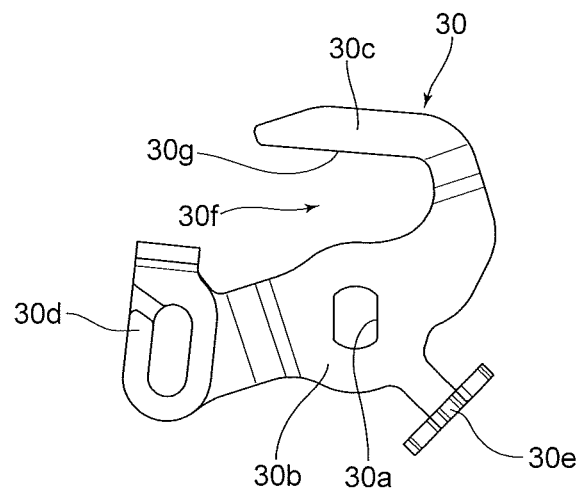
FIG. 16 is a plan view of a second lever as a part of the seat reclining apparatus, viewed from the seat inner side.

As shown in FIGS. 2 and 16, the second lever 30 is provided with a center portion 30b in which a noncircular hole 30a in the shape of a double-D hole is formed, and is further provided with a hook portion 30c, a cable connection portion 30d and a spring hook portion 30e which project from the center portion 30b in different directions. The hook portion 30c is a cantilever-shaped projection the base end of which is connected to the center portion 30b. The hook portion 30c is shaped to firstly project, from the base end thereof, in a radial direction centered on the noncircular hole 30a and subsequently bend substantially in the rotational direction (the counterclockwise direction with respect to FIG. 16) centered on the shaft member 32. The second lever 30 is provided between the hook portion 30c and the center portion 30a with a recessed portion 30f which is open in the rotational direction of the second lever 30 (specifically in the leftward direction with respect to FIG. 16), and the hook portion 30c is provided thereon with a linear (planar) contact edge 30g that forms an inner edge of the recessed portion 30f. The spring hook portion 30e bends substantially orthogonally to the center portion 30b to project toward the seat inner side (see FIGS. 2 and 3).

Figure 17:
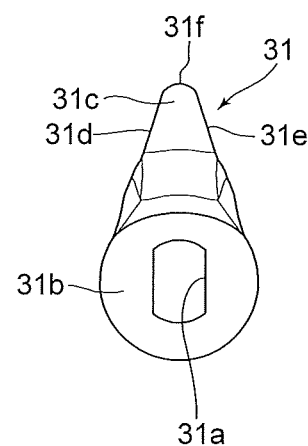
FIG. 17 is a plan view of a cancel lever as a part of the seat reclining apparatus, viewed from the seat inner side.

As shown in FIGS. 2 and 17, the cancel lever 31 is provided with a center portion 31b and a pressed projection 31c which radially projects from the center portion 31b, and a noncircular hole 31a in the shape of a double-D hole is formed in the center portion 31b. The pressed projection 31c has a tapered shape, being provided with a pair of side surfaces 31d and 31e which progressively decreases in distance therebetween with respect to the direction toward the tip of the pressed projection 31c away from the center portion 31b. The tip of the pressed projection 31c is formed as a smoothly-curved tip surface 31f.

The shaft member 32 is provided in the middle part thereof in the axial direction with a circular cross-sectional portion and coaxially provided on either side of this circular cross-sectional portion with two noncircular cross-sectional portions (double-D shaft portions). One of these two noncircular cross-sectional portions of the shaft member 32 is inserted into the noncircular hole 30a of the second lever 30. The circular cross-sectional portion of the shaft member 32 is inserted into a substantially circular-shaped shaft hole 11d (see FIG. 2) which is formed in the lower bracket 11 to be rotatable on the axis of the shaft member 32 relative to the lower bracket 11. The other noncircular cross-sectional portion of the shaft member 32 is inserted into the noncircular hole 31a of the cancel lever 31. The second lever 30 and the cancel lever 31, each of which is supported by the associated noncircular cross-sectional portion of the shaft member 32, can integrally rotate about the axis of the shaft member 32 relative to the lower bracket 11. The lower bracket 11 is provided, at a position along the spring hook portion 30e of the second lever 30, with a lanced lug 11e (see FIGS. 3 and 4) which projects toward the seat outer side. The base of the lanced lug 11e is connected to the inner edge of a relief hole 11f formed in the lower bracket 11. The spring hook portion 30e is inserted into the relief hole 11f, and rotation of the second lever 30 causes the spring hook portion 30e to move in the relief hole 11f.

Swing motion (rotation) of the second lever 30 about the shaft portion 32 causes the hook portion 30c to advance onto and retreat from the movement path of the link pin 23 (the rotational path of the link pin 23 about the shaft portion 22), provided on the first lever 21. When the second lever 30 is positioned at a latching position (first position) (shown in FIGS. 5 and 9), the hook portion 30c advances onto the movement path of the link pin 23 (the link pin 23 enters the recessed portion 30f). When the first lever 21 is in the restriction release position and the second lever 30 is in the latching position, the link pin 23 is in contact with the contact edge 30g of the hook portion 30c, so that the second lever 30 prevents the first lever 21 from rotating to the forward-tilt restriction position. When the second lever 30 is positioned at an unlatching position (second position) (shown in FIG. 7), the hook portion 30c retreats from the movement path of the link pin 23 (the link pin 23 is disengaged from the recessed portion 30f), which allows the first lever 21 to rotate to the forward-tilt restriction position. The second lever 30 can further rotate clockwise with respect to FIG. 5 to an over-latching position (third position) (shown in FIG. 11) beyond the latching position, which is located a predetermined distance away from the latching position in the opposite direction from the direction toward the unlatching position. When the second lever 30 is positioned at the over-latching position, the hook portion 30c advances onto the movement path of the link pin 23, so that the first lever 21 is prevented from rotating to the forward-tilt restriction position by contact of the link pin 23 with the contact edge 30g of the hook portion 30c, similar to the case where the second lever 30 is positioned at the latching position.

Accordingly, the second lever 30 can rotate from the latching position (shown in FIGS. 5 and 9), which is an intermediate position, to the unlatching position (shown in FIG. 7) and the over-latching position (shown in FIG. 11) in the forward and reverse directions, respectively; the first lever 21 is held in the restriction release position by contact between the hook portion 30c and the link pin 23 when the second lever 30 is in either of the two positions: the latching position and the over-latching position, and the restrictions on rotation of the first lever 21 is released when the second lever 30 is in the unlatching position. As shown in FIGS. 5, 9 and 11, the contact edge 30g of the second lever 30 becomes a surface extending substantially in a radial direction centered on the shaft member 22 when the link pin 23 comes in contact with the contact edge 30g. Therefore, when the link pin 23 comes in contact with the contact edge 30g, the contact edge 30g is positioned relative to the movement path of the link pin 23 so as to generally confront the movement path of the link pin 23, which makes it possible to prevent the first lever 21 from rotating with efficiency and reliability without the first lever 21 causing an unwanted component of force with respect to the rotational direction of the second lever 30 against the second lever 30.

Swing motion (rotation) of the cancel lever 31 about the shaft portion 32 causes the pressed projection 31c to advance onto and retreat from the movement path of the control projection 25 of the upper bracket 12 (the rotational path of the control projection 25 about the rotation center 5x). When the second lever 30 is in the latching position (shown in FIGS. 5 and 9), the cancel lever 31 is in a neutral position (first position) (shown in FIGS. 6 and 10) in which the pressed projection 31c advances onto the movement path of the control projection 25. When the second lever 30 is in the unlatching position (shown in FIG. 7), the cancel lever 31 is in a first free-swing position (second position) (shown in FIG. 8) in which the pressed projection 31c retreats from the movement path of the control projection 25. When the second lever 30 is in the over-latching position (shown in FIG. 11), the cancel lever 31 is in a second free-swing position (third position) (shown in FIG. 12) in which the pressed projection 31c retreats from the movement path of the control projection 25.

Accordingly, the cancel lever 31 can rotate from the neutral position (shown in FIGS. 6 and 10) to the first free-swing position (shown in FIG. 8) and the second free-swing position (shown in FIG. 12) in the forward and reverse directions, respectively, and the position of the cancel lever 31 is controlled in accordance with movement of the control projection 25, which is caused by rotation of the upper bracket 12.

The stopper pin 24, which is provided on the first lever 21, and the pressed projection 31c, which is provided on the cancel lever 31, are arranged at different positions in the rotational direction of the upper bracket 12, and the control projection 25 comes into contact with the stopper pin 24 and the pressed projection 31c of the cancel lever 31 at different timings in accordance with the operation of the upper bracket 12. As shown in FIGS. 6, 8 and 10, the control projection 25 comes into contact with the cancel lever 31 (the pressed projection 31c) and the stopper pin 24 in that order when the upper bracket 12 (the seatback 5) tilts forward.

The second lever 30 and the cancel lever 31 are each biased toward the latching position and the intermediate position, respectively, by a torsion spring (an element of the holding mechanism/biasing member) 33. The torsion spring 33 is provided with a coiled portion which surrounds the circular cross-sectional portion of the shaft member 32 and a pair of spring ends which extend radially outward from the coiled portion. The pair of spring ends of the torsion spring 33 are hooked over the spring hook portion 30e of the second lever 30 and the lanced lug 11e of the lower bracket 11, respectively, in such a manner to hold the spring hook portion 30e and the lanced lug 11e (see FIGS. 3 and 4).

When the second lever 30 rotates from the latching position in the forward and reverse directions, one of the pair of spring ends of the torsion spring 33 is pressed by the spring hook portion 30e and the other spring end of the torsion spring 33 is prevented from moving by engaging with the lanced lug 11e. Accordingly, the torsion spring 33 is twisted while increasing the distance between the pair of spring ends thereof. The resiliency of the torsion spring 33 that eliminates this torsional deformation acts as a biasing force which urges the second lever 30 to return to the latching position and urges the cancel lever 31 to return to the neutral position. As described above, when the second lever 30 is in the latching position or the over-latching position, the positional relationship between the link pin 23 and the contact edge 30g is such that a component of force with respect to the rotational direction of the second lever 30 is not easily transmitted to the contact edge 30g from the link pin 23 (the contact edge 30g confronts the moving direction of the link pin 23), which makes it possible to reduce the load required for the torsion spring 33.

Figure 18:
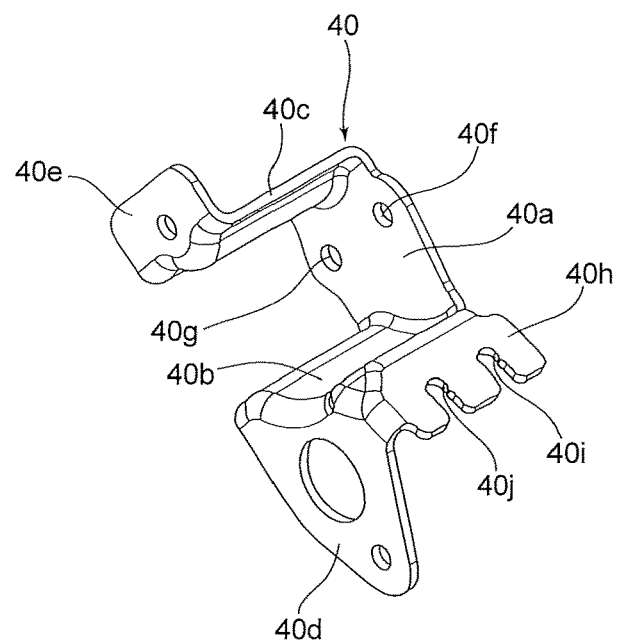
FIG. 18 is a perspective view of a first bracket as a part of the seat reclining apparatus.

The seat reclining apparatus 10 is provided with a first bracket 40 which is fixed to the seat outer side of the lower bracket 11 to be positioned in the vicinity of the lower end of the lower bracket 11. As shown in FIG. 18, the first bracket 40 is provided with a flat-plate-shaped support plate portion 40a, two leg portions 40b and 40c, and flat-plate-shaped seating portions 40d and 40e. The two leg portions 40b and 40c extend toward the lower bracket 11 side (the seat inner side) from the support plate portion 40a, and the seating portions 40d and 40e extend substantially parallel to the support plate portion 40a from the ends of the leg portions 40b and 40c, respectively. The support plate portion 40a is provided with a shaft bearing hole 40f and a fastening hole 40g. The first bracket 40 is provided with a flat-plate-shaped side plate 40h which projects from the leg portion 40b to 11e in a plane substantially orthogonal to both the support plate portion 40a and the seating portion 40d. The side plate 40h is provided, at different positions in the height direction of the first bracket 40 (which corresponds to the widthwise direction of the vehicle seat 1), with two cable support grooves 40*i* and 40*j*. The two cable support grooves 40*i* and 40*j* are substantially parallel to each other and open to an edge of the side plate 40*h*. In a state where the first bracket 40 is fixed to the lower bracket 11, the openings of the two cable support grooves 40*i* and 40*j* at the aforementioned edge of the side plate 40*h* is substantially oriented toward the rear of the vehicle.

Figure 19:
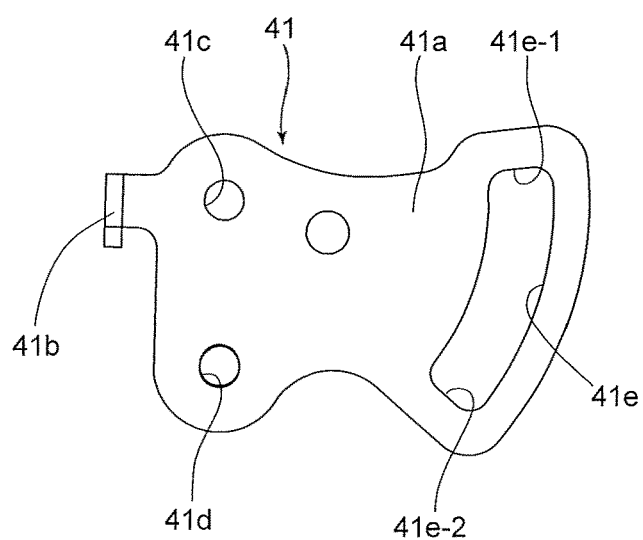
FIG. 19 is a plan view of a support guide plate as a part of the seat reclining apparatus, viewed from the seat inner side.

The seat reclining apparatus 10 is provided with a support guide plate 41 which is fixed onto the support plate portion 40*a* of the first bracket 40. As shown in FIGS. 2 and 19, the most part of the support guide plate 41 is configured of the flat plate portion 41*a*, and a spring hook portion 41*b* projects from an edge of the flat plate portion 41*a* toward the seat outer side. The flat plate portion 41*a* is greater in planer dimension than the support plate portion 40*a* of the first bracket 40. A shaft bearing hole 41*c* and a fastening hole 41*d* are formed in a portion of the flat plate portion 41*a* which overlaps the support plate portion 40*a*, and a circular arc hole 41*e* is formed in another portion of the flat plate portion 41*a* which does not overlap the support plate portion 40*a*. The circular arc hole 41*e* is an elongated hole which is elongated in the circumferential direction about the shaft bearing hole 41*c*. Both ends 41*e*-1 and 41*e*-2 of the circular arc hole 41*e* in the longitudinal direction thereof are each formed into a linear shape (flat surface) extending in a radial direction centered on the shaft bearing hole 41*c*.

Figure 20:
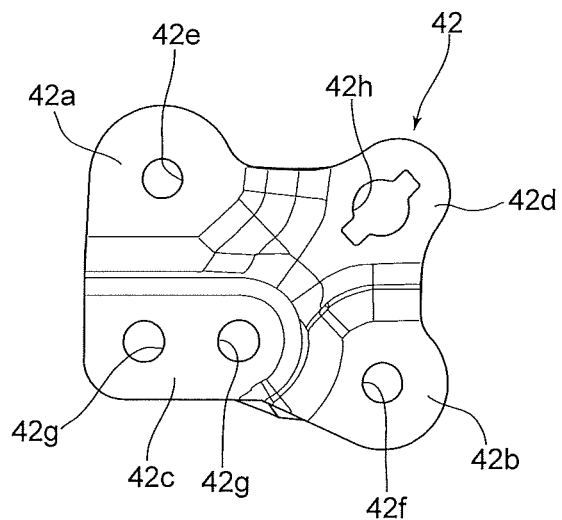
FIG. 20 is a handle fastening member as a part of the seat reclining apparatus, viewed from the seat inner side.

The handle fastening member 42 is supported on the flat plate portion 41*a* of the support guide plate 41. As shown in FIGS. 2 and 20, the handle fastening member 42 is provided with two flat plate portions 42*a* and 42*b* which substantially lie in a plane and another two flat plate portions 42*c* and 42*d* which are offset toward the seat outer side from the two flat plate portions 42*a* and 42*b*. The flat plate portion 42*a* and the flat plate portion 42*b* are substantially diagonally opposite to each other, while the flat plate portion 42*c* and the flat plate portion 42*d* are substantially diagonally opposite to each other. A shaft hole 42*e* is formed in the flat plate portion 42*a* and a guide pin mounting hole 42*f* is formed in the flat plate portion 42*b*. In addition, two handle fastening holes 42*g* are formed in the flat portion 42*c* and a rod mounting hole 42*h* is formed in the flat plate portion 42*d*.

Figure 13:
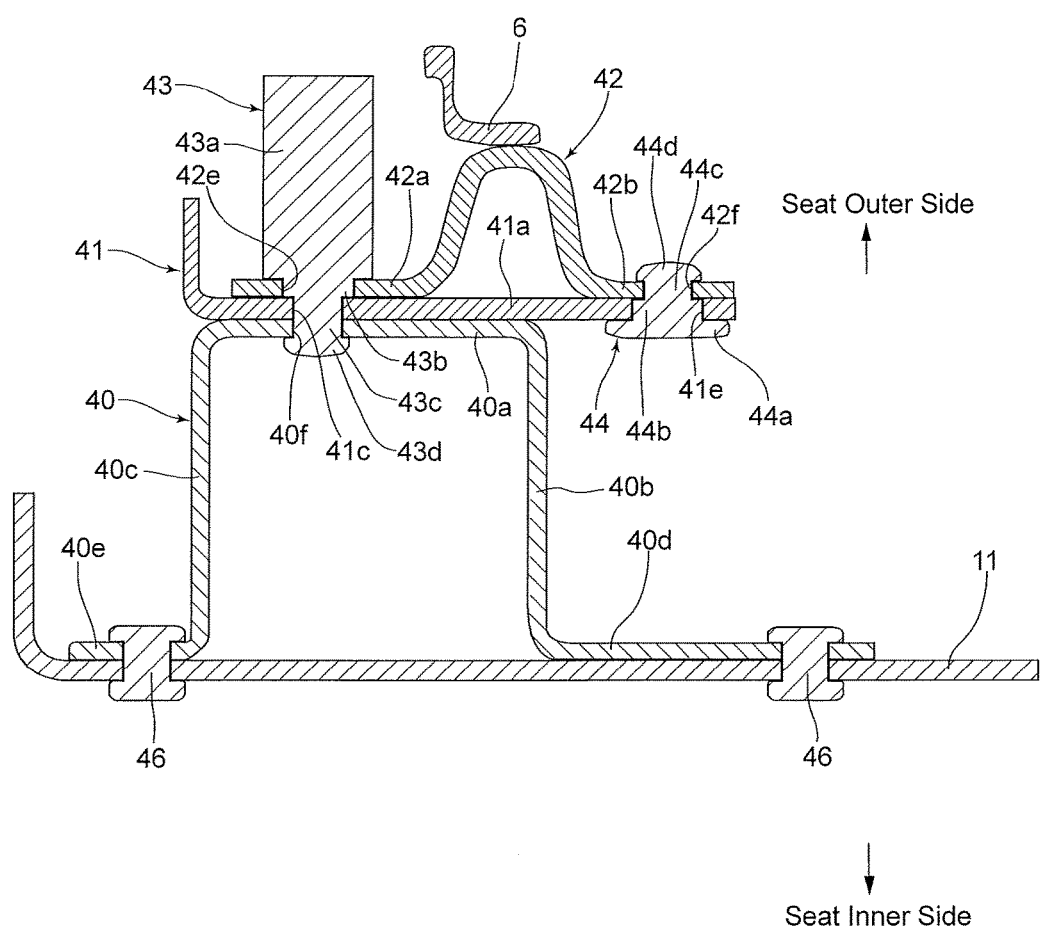
FIG. 13 is a sectional view taken along the line XIII-XIII shown in FIG. 5.

As shown in FIG. 13, the first bracket 40, the support guide plate 41 and the handle fastening member 42 are overlaid on top of one another with the shaft bearing hole 40*f*, the shaft bearing hole 41*c* and the shaft hole 42*e* aligned and overlaid to be communicatively connected. In addition, the support guide plate 41 and the handle fastening member 42 are positioned relative to each other so that the circular arc hole 41*e* and the guide pin mounting hole 42*f* are aligned and overlaid (see FIG. 13), and the first bracket 40 and the support guide plate 41 are positioned relative to each other so that the fastening hole 40*g* and the fastening hole 41*d* are aligned and overlaid (see FIG. 9). In this aligned and overlaid state, the support plate portion 40*a* of the first bracket 40 abuts against the flat plate portion 41*a* of the support guide plate 41 from the seat inner side, while the flat plate portions 42*a* and 42*b* of the handle fastening member 42 abut against the flat plate portion 41*a* of the support guide plate 41 from the seat outer side.

As shown in FIG. 13, the seat reclining apparatus 10 is provided with a shaft member 43 which is inserted into the shaft bearing hole 40*f*, the shaft bearing hole 41*c* and the shaft hole 42*e*. The shaft member 43 is provided with a large-diameter portion 43*a*, a medium-diameter portion 43*b* and a small-diameter portion 43*c* which are coaxially aligned and each of which has a cylindrical outer peripheral surface. The shaft member 43 is inserted into the shaft hole 42*e*, the shaft bearing hole 41*c* and the shaft bearing hole 40*f*, in that order from the seat outer side toward the seat inner side (namely, from the shaft hole 42*e* side toward the shaft support hole 40*f*), with the small-diameter portion 43*c* as an insertion end. The shaft member 43 is provided, at the boundary between the large-diameter portion 43*a* and the medium-diameter portion 43*b*, with a stepped portion which prevents further insertion of the shaft member 43 by abutting against the flat plate portion 42*a* of the handle fastening member 42 as shown in FIG. 13. In this state where further insertion of the shaft member 43 is prevented, the medium-diameter portion 43*b* is positioned in the shaft hole 42*e*, the small-diameter portion 43*c* is positioned in the shaft bearing holes 40*f* and 41*c*, and the end (the lower end with respect to FIG. 13) of the small-diameter portion 43*c* projects toward the seat inner side from the shaft bearing hole 40*f* (the support plate portion 40*a*). By providing the shaft member 43 with a swaged portion 43*d* at the end of the small-diameter portion 43*c*, which projects from the shaft bearing hole 40*f*, by swaging, the support plate portion 40*a* and the flat plate portions 41*a* and 42*a* are sandwiched between the large-diameter portion 43*a* and the swaged portion 43*d* of the shaft member 43. The shaft bearing hole 40*f* and the shaft bearing hole 41*c* are circular holes having substantially the same diameter, allowing the small-diameter portion 43*c* to be inserted with substantially no play. The shaft hole 42*e* is a circular hole which is greater in diameter than the shaft bearing hole 40*f* and the circular arc hole 41*e*, and the inner peripheral surface of the shaft hole 42*e* is in contact with the outer peripheral surface of the medium-diameter portion 43*b* to be rotatable relative to the outer peripheral surface of the medium-diameter portion 43*b*.

Figure 3:
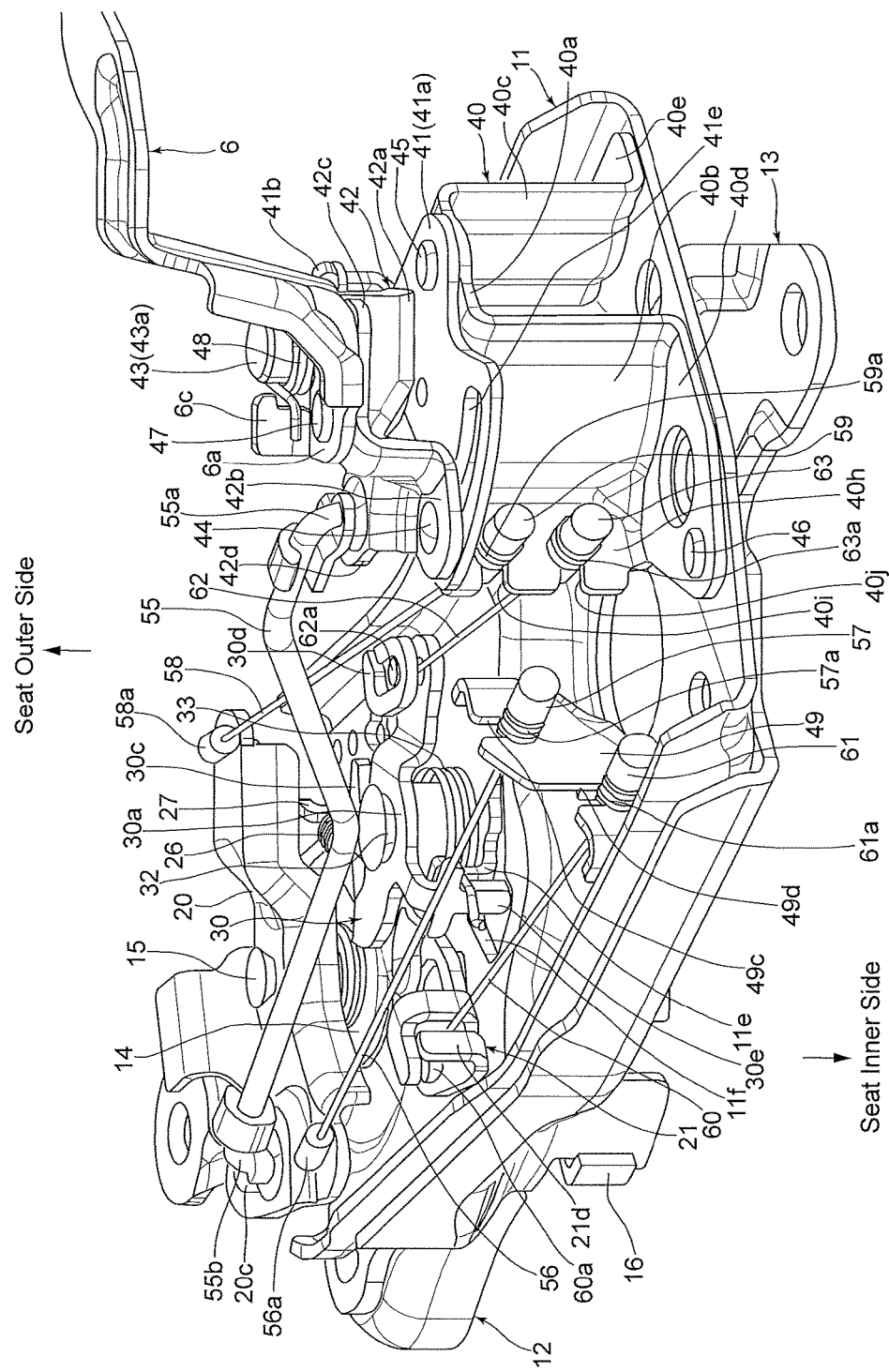
FIG. 3 is a perspective view of the seat reclining apparatus.

As shown in FIG. 13, the seat reclining apparatus 10 is provided with a guide pin 44 which is inserted into the circular arc hole 41*e* and the guide pin mounting hole 42*f*. The guide pin 44 is provided with a head 44*a*, a medium-diameter portion 44*b* and a small-diameter portion 44*c* which are coaxially aligned and each of which has a cylindrical outer peripheral surface. The guide pin 44 is inserted into the circular arc hole 41*e* and the guide pin mounting hole 42*f*, in that order from the seat inner side toward the seat outer side (i.e., from the circular arc hole 41*e* side toward the guide pin mounting hole 42*f*), with the small-diameter portion 44*c* as an insertion end. The guide pin 44 is provided, at the boundary between the head 44*a* and the medium-diameter portion 44*b*, with a stepped portion which prevents further insertion of the guide pin 44 by abutting against the flat plate portion 41*a* of the support guide plate 41. In this state where further insertion of the guide pin 44 is prevented, the medium-diameter portion 44*b* is positioned in the circular arc hole 41*e*, the small-diameter portion 44*c* is positioned in the guide pin mounting hole 42*f*, and the end (the upper end with respect to FIG. 13) of the small-diameter portion 44*c* projects toward the seat outer side from the shaft bearing hole 42*f* (the flat plate portion 42*b*). By providing the guide pin 44 with a swaged portion 44*d* at the end of the small-diameter portion 44*c*, which projects from the guide pin mounting hole 42*f*, by swaging, the flat plate portions 41*a* and 42*b* are sandwiched between the head 44*a* and the swaged portion 44*d* of the guide pin 44. The small-diameter portion 44*c* is inserted into the guide pin mounting portion 42*f* with substantially no play. The width of the circular arc hole 41*e* is greater than the diameter of the guide pin mounting hole 42*f*, which allows the outer peripheral surface of the medium-diameter portion 44*b* to move along the pair of facing circular arc surfaces of the circular arc hole 41*e*. As shown in FIG. 3, the leg portion 40*b* of the first bracket 40 is provided with a wall surface which curves along the circular arc hole 41e, so that the leg portion 40b does not interfere with the head 44a of the guide pin 44 that projects toward the seat inner side from the circular arc hole 41e. In addition, such a curved shape of the leg portion 40b improves the stiffness thereof. Additionally, the leg portion 40c also has a curved shape, thus having high stiffness.

A rivet 45 (see FIGS. 2 and 5) is inserted into the fastening holes 40g and 41d. The rivet 45 has a head and a cylindrical shaft, which is smaller in diameter than the head. The tail of the shaft of the rivet 45 which is inserted into the fastening holes 40g and 41d with no play is swaged into a bucked tail, thereby the support plate portion 40a and the flat plate portion 41b being fastened and fixed to each other. The support plate portion 40a and the flat plate portion 41a are further fixed by welding (not shown).

As shown in FIG. 13, the flat-plate-shaped seating portions 40d and 40e of the first bracket 40 are in contact with a surface of the lower bracket 11 which is positioned on the seat outer side, and the flat-plate-shaped seating portions 40d and 40e are fastened and fixed to the lower bracket 11 by two rivets 46. In this fixed state, a space surrounded by the support plate portion 40a, the leg portions 40b and 40c and the lower bracket 11 is formed, and the support plate portion 40a is spaced from and faces a surface of the lower bracket 11 which is positioned on the seat outer side.

With the above described structure, the first bracket 40 and the support guide plate 41 that are fixed to each other are fixedly supported by the lower bracket 11. The handle fastening member 42 is supported on the support guide plate 41 to be rotatable on the shaft member 43 with the flat plate portions 42a and 42b in contact with the flat plate portion 41a. Rotation of the handle fastening member 42 causes the medium-diameter portion 44b of the guide pin 44 to move in the circular arc hole 41e, and forward and reverse rotations (clockwise and counterclockwise rotations with respect to FIG. 20) of the handle fastening member 42 with respect to the support guide plate 41 are restricted by contact of the medium-diameter portion 44b with the end portion 41e-1 and the end portion 41e-2 of the circular arc hole 41e, respectively. In other words, the swing (rotation) angular range of the handle fastening member 42 is determined by the guide pin 44 and the circular arc hole 41e.

The lock release handle 6 is fixed to the handle fastening member 42. As shown in FIG. 2, the lock release handle 6 is provided at one end thereof with a flat plate portion 6a which comes in surface contact with the flat plate portion 42c of the handle fastening member 42, and further provided in the flat plate portion 6a with two fastening holes 6b. The lock release handle 6 is provided with a spring hook lug 6c which projects toward the seat outer side from the flat plate portion 6a. The lock release handle 6 and the handle fastening member 42 are fastened and fixed by making the flat plate portion 6a and the flat plate portion 42c come into surface contact with each other with the two fastening holes 6b and the two handle fastening holes 42b aligned, subsequently inserting the two rivets 47 (shown in FIGS. 2 and 5) into the two fastening holes 6b and the two handle fastening holes 42b and subsequently swaging the tail of the shaft of each rivet 47. Accordingly, a combination of the lock release handle 6 and the handle fastening member 42 is swingably (rotatably) supported by the first bracket 40 and the support guide plate 41, which are fixedly supported by the lower bracket 11, via the shaft member 43. The axis of the shaft member 43 coincides with the rotation center 6x (shown in FIG. 1) of the lock release handle 6.

The seat reclining apparatus 10 is provided with a torsion spring 48 for biasing the lock release handle 6. The torsion spring 48 has a coiled portion which is supported on the periphery of the large-diameter portion 43a of the shaft portion 43. The torsion spring 48 is provided with a pair of spring ends which extend radially outward from the coiled portion. The pair of spring ends of the torsion spring 43 are hooked over the spring hook lug 6c of the lock release handle 6 and the spring hook lug 41b of the support guide plate 41, respectively. The torsion spring 48 gives the lock release handle 6 a biasing force which urges the lock release handle 6 to rotate in the clockwise direction with respect to FIGS. 1, 5, 7, 9 and 11 or the counterclockwise direction with respect to FIGS. 6, 8, 10 and 12, and this biasing force acts on the lock release handle 6 in a direction to bring the guide pin 44 (the medium-diameter portion 44b) into contact with the end 41e-1 of the circular arc hole 41e. The position at which the guide pin 44 comes into contact with the end 41e-1 of the circular arc hole 41e refers to an initial position of the lock release handle 6.

Figure 21:
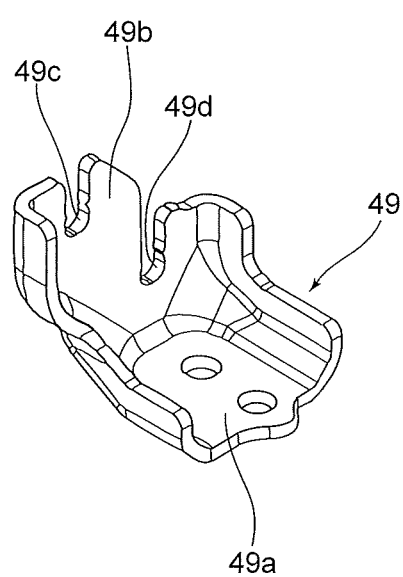
FIG. 21 is a perspective view of a second bracket as a part of the seat reclining apparatus.

The seat reclining apparatus 10 is provided with a second bracket 49 which is fixed to the lower bracket 11. The second bracket 49 is fixed to a surface of the lower bracket 11 which is positioned on the seat outer side at a position different from the position of the first bracket 40 and below the positions at which the open plate 20, the first lever 21 and the second lever 30 are supported. As shown in FIG. 21, the second bracket 49 is provided with a flat-plate-shaped seating portion 49a and an upright wall portion 49b which projects toward the seat outer side from the seating portion 49a. With the seating portion 49a made to abut against a surface of the lower bracket 11 which is positioned on the seat outer side, the seating portion 49a is fastened and fixed to the lower bracket 11 via two rivets 50 (shown in FIGS. 2 and 5). The upright wall portion 49b is provided, at two different positions in the forward and rearward directions of the vehicle seat, with two cable support grooves 49c and 49d.

Manually operating the lock release handle 6 causes this operating force to be transmitted to the open plate 20 via a connecting rod 55. One end 55a of the connecting rod 55 is connected to the rod mounting hole 42h, which is formed in the flat plate portion 42d of the handle fastening member 42 that is fixed to the lock release handle 6, while the other end 55b of the connecting rod 55 is connected to the circular arc hole 20c of the open plate 20. The end 55b of the connecting rod 55 is movable in the circular arc hole 20c, and the end 55b is positioned in a portion of the circular arc hole 20c in the vicinity of the lower end thereof when the lock release handle 6 is in the initial position. Turning the lock release handle 6 in the pulling direction (the counterclockwise direction with respect to FIG. 5 and the clockwise direction with respect to FIG. 6) from the initial position against the biasing force of the torsion spring 48 causes the end 55b to come into contact with and press the lower end of the circular arc hole 20c to transmit the turning force to the open plate 20, thus causing the open plate 20 to rotate toward the lock release position from the lock position (in the counterclockwise direction with respect to FIG. 5). In FIGS. 5, 7, 9 and 11, a middle portion of the connecting rod 55 is not shown for clarification of other components.

Manually operating the walk-in lever 7 causes this operating force to be transmitted to the open plate 20 via an operating cable 56. An end 56a of the operating cable 56 is connected to the cable connection hole 20b of the open plate 20. The operating cable 56 is extended downward from the cable connection hole 20b and inserted into a tubular cable guide 57 (partly shown in FIGS. 3 and 4) to be capable of advancing and retreating therein. A fitting portion 57a provided at one end of the cable guide 57 is fitted in the cable support groove 49c, which is provided on the second bracket 49, to be prevented from moving in the direction of extension of the operating cable 56. Although not shown in the drawings, the operating cable 56 changes the extension direction thereof at a position below the second bracket 49 to extend upward to be connected to the walk-in lever 7. Manually operating the walk-in lever 7 causes the open plate 20 to be given a force which pulls down a portion of the open plate 20 in the vicinity of the cable connection hole 20b via the operating cable 56, thus causing the open plate 20 to rotate toward the lock release position from the lock position (in the counterclockwise direction with respect to FIG. 5). When the open plate 20 is rotated to the lock release position by pulling the operating cable 56, the end 55 of the connecting rod 55 moves in the circular arc hole 20c to thereby vary the position of the end 55b in the circular arc hole 20c, so that no force in the rotational direction is transmitted to the connecting rod 55 from the open plate 20; therefore, the lock release handle 6 remains in the initial position.

One end 58a of a link cable 58 is connected to the cable connection hole 20d of the open plate 20. The link cable 58 is for making the seat reclining apparatus 10, which is provided on one side of the vehicle seat 1, and the other seat reclining apparatus, provided on the opposite side (the left-side with respect to the direction in which the vehicle is headed) of the vehicle seat 1, associated with each other. The link cable 58 is extended downward from the cable connection hole 20d and inserted into a tubular cable guide 59 (partly shown in FIGS. 3 and 4) to be capable of advancing and retreating therein. A fitting portion 59a provided at one end of the cable guide 59 is fitted in the cable support groove 40i, which is provided on the first bracket 40, to be prevented from moving in the direction of extension of the operating cable 58.

Although the overall structure of the seat reclining apparatus provided on the opposite side (left side) of the vehicle seat 1 is not shown in the drawings, this seat reclining apparatus is provided with an open plate 70 (see FIG. 5) and the reclining lock mechanism 71 (see FIG. 5) which correspond to the open plate 20 and the reclining lock mechanism 14 of the seat reclining apparatus 10, respectively. The open plate 70 rotates about the hinge pin 72 to change the reclining lock mechanism 71 between a locked state and an unlocked state. As shown in FIG. 5, the link cable 58 comes out from a fitting portion 59b which is provided at the other end of the cable guide 59, and the other end 58b of the link cable 58 is connected to a cable connection portion 70a provided on the open plate 70. The cable connection portion 70a is shaped to have a slit allowing the end 58b of the link cable 58 to be engaged therein with enough clearance in the direction of extension of the link cable 58, so that the cable connection portion 70a can absorb deflection of the link cable 58. Rotations of the open plate 20 to the lock position and the lock release position cause the open plate 70 to rotate in the locking direction and the unlocking direction via the link cable 58, respectively, thus causing each of the reclining lock mechanism 14 and the reclining lock mechanism 71 to transition to a locked state and an unlocked state, respectively, in association with each other. The seat reclining apparatus which is equipped with the open plate 70 is not provided with a lock release handle corresponding to the lock release handle 6.

Manually operating the seatback fold-down lever 8 causes this operating force to be transmitted to the first lever 21 via an operating cable 60. An end 60a of the operating cable 60 is connected to the cable connection portion 21d of the first lever 21. The cable connection portion 21d is shaped to have a slit allowing the end 60a of the link cable 60 to be engaged therein with enough clearance in the direction of extension of the link cable 60, so that the cable connection portion 21d can absorb deflection of the link cable 60. The operating cable 60 is extended downward from the cable connection portion 21d and inserted into a tubular cable guide 61 (partly shown in FIG. 3) to be capable of advancing and retreating therein. A fitting portion 61a provided at one end of the cable guide 61 is fitted in the cable support groove 49d, which is provided on the second bracket 49, to be prevented from moving in the direction of extension of the operating cable 60. Although not shown in the drawings, the operating cable 60 changes the extension direction thereof at a position below the second bracket 49 to extend upward to be connected to the seatback fold-down lever 8. Manually operating the seatback fold-down lever 8 when the first lever 21 is in the forward-tilt restriction position (shown in FIG. 7) causes the first lever 21 to be given a force which pulls down a portion of the first lever 21 in the vicinity of the cable connection portion 21d via the operating cable 60, thus causing the first lever 21 to rotate toward the restriction release position from the forward-tilt restriction position (in the counterclockwise direction with respect to FIG. 7).

An end 62a of a slide-lock operating cable 62 is connected to the cable connection portion 30d of the second lever 30. The cable connection portion 30d is shaped to have a slit allowing the end 62a of the slide-lock operating cable 62 to be engaged therein with enough clearance in the direction of extension of the slide-lock operating cable 62, so that the cable connection portion 30d can absorb deflection of the slide-lock operating cable 62. The slide-lock operating cable 62 is extended downward from the cable connection portion 30d and inserted into a tubular cable guide 63 (partly shown in FIGS. 3 and 4) to be capable of advancing and retreating therein. A fitting portion 63a provided at one end of the cable guide 63 is fitted in the cable support groove 40j, which is provided on the first bracket 40, to be prevented from moving in the direction of extension of the slide-lock operating cable 62.

The slide-lock operating cable 62 is connected to a lock release member (not shown) provided as an element of the slide-lock mechanism 3. The aforementioned slide-locked state, in which the pair of upper rails 2b is prevented from sliding relative to the pair of lower rails 2a by the slide-lock mechanism 3, is maintained without the lock release member being operated when the second lever 30 is held in the latching position (shown in FIGS. 5 and 9) or the over-latching position (shown in FIG. 11). Upon the second lever 30 rotating to the unlatching position (shown in FIG. 7), the pulling force of the slide-lock operating cable 62 is transmitted to the lock release member, which causes the lock release member to perform a slide-lock release operation (an operation to cause the pair of upper rails 2b to transition to the aforementioned slide allowing state).

As described above, the seat reclining apparatus 10 is provided with a total of four cables: the operating cable 56 and the link cable 58 (which are connected to the open plate 20), the operating cable 60 (which is connected to the first lever 21) and the slide-lock operating cable 62 (which is connected to the second lever 30). Among these four cables, the link cable 58 and the slide-lock operating cable 62 are supported by the first bracket 40 via the cable support grooves 40i and 40j, and the operating cables 56 and 60 are supported by the second bracket 49 via the cable support grooves 49c and 49d. The structure which supports the four cables via the first bracket 40 and the second bracket 49 is superior in flexibility in productivity and arrangement of the portions which support the four cables compared with a structure in which the portions which support the four cables are formed directly on the lower bracket 11, which is provided as a relatively large member. In addition, the cable support structure in which each of the first bracket 40 and the second bracket 49 supports more than one cable contributes to reduction in the number of components which are involved in support for the cables 56, 58, 60 and 62, which makes it possible to simplify the structure of the seat reclining apparatus 10. Additionally, since the four cables 56, 58, 60 and 62 are divided into two pairs in which the cables of each pair are placed close to each other and which are respectively supported by the first bracket 40 and the second bracket 49, the seat reclining apparatus 10 can achieve a space-saving design by making each of the cable support portions (the side plate 40h and the upright wall portion 49b) of the first bracket 40 and the second bracket 49 compact in size.

Figure 4:
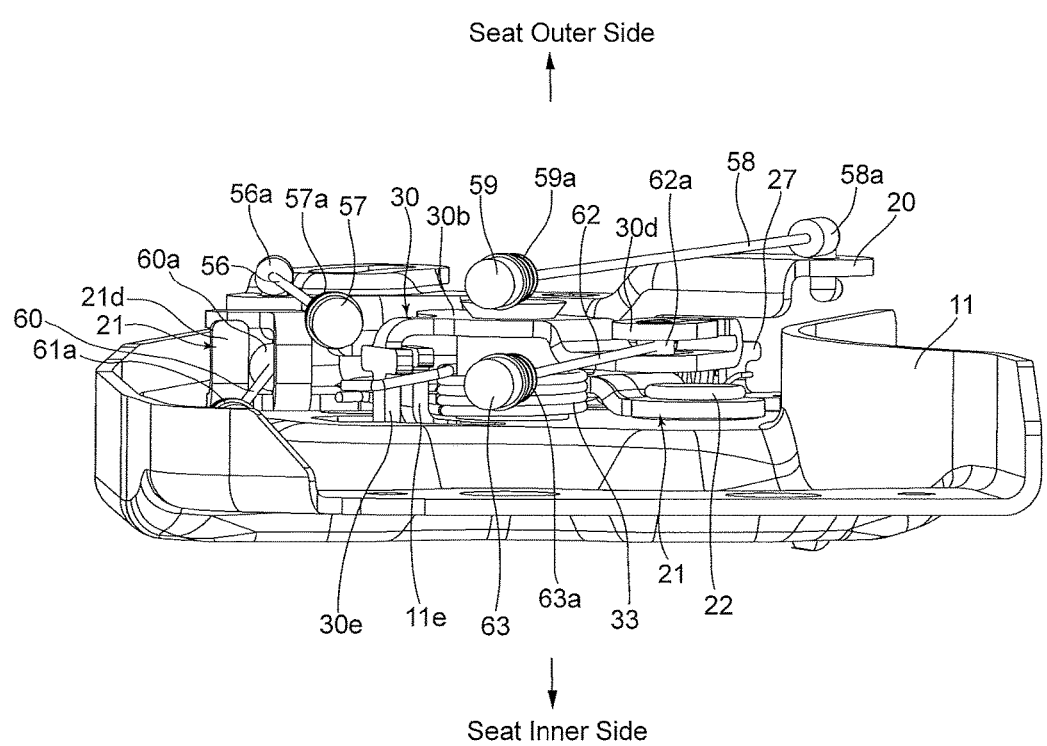
FIG. 4 is a perspective view of the seat reclining apparatus, viewed from a different angle from FIG. 3, with the component parts of the seat reclining apparatus partly removed for clarity.

As shown in FIGS. 3 and 4, the portion of the open plate 20 in which the cable connection hole 20b is formed and the cable connection portion 21d of the first lever 21 are formed at different positions in the height direction with respect to the lower bracket 11 (in the widthwise direction of the vehicle seat 1); specifically, the cable connection hole 20b is formed at a position (high position) far from the base surface of the lower bracket 11, while the cable connection portion 21d is formed at a position (low position) close to the base surface of the lower bracket 11. In accordance with this positional relationship, the end 56a of the operating cable 56 and the end 60a of the operating cable 60 are mutually different in position in the height direction.

As shown in FIGS. 3 and 21, the cable support grooves 49c and 49d of the second bracket 49 are grooves each of which is elongated in the height direction. The end of each cable support groove 49c and 49d (the lower end thereof in the height direction (the vertical direction with respect to FIG. 21)) on the base end side (the lower side with respect to FIG. 21) of the upright wall portion 49b, which is close to the seating portion 49a, is closed to be formed as the bottom of the groove, while the other end of each cable support groove 49c and 49d (the upper end thereof in the height direction) on the outer end side (the upper end side with respect to FIG. 21) of the upright wall portion 49b, which is far from the seating portion 49a, is formed as an open end. The cable support grooves 49c and 49d are formed side by side on the upright wall portion 49b at different positions in the height direction. The cable support groove 49c is formed at a position (high position) far from the seating portion 49a, and the cable support groove 49d is formed at a position (low position) close to the seating portion 49a.

Accordingly, the operating cable 56, which extends from the cable connection hole 20b to the cable support groove 49c (to the fitting portion 57a, which is fitted in the cable support groove 49c), and the operating cable 60, which extends from the cable connection portion 21d to the cable support groove 49d (to the fitting portion 61a, which is fitted in the cable support groove 49d), are led to the second bracket 49 with the positional relationship (high-low relationship) between the cable connection hole 20b and the cable connection portion 21d in the height direction maintained, and arranged so as not to intersect each other in the height direction. According to this arrangement, the operating cables 56 and 60 do not interfere with each other though positioned to intersect each other or lie close to each other when seen in a plan view as shown in FIGS. 5, 7, 9 and 11, which makes it possible to increase the degree of freedom in arrangement of the operating cables 56 and 60. Since the open plate 20, which has the cable connection hole 20b, and the first lever 21, which has the cable connection portion 21d, in particular, are positioned relative to each other so that the rotational paths thereof overlap each other when seen in a plan view (see FIG. 7), providing the two operating cables 56 and 60 in a manner so as not to intersect each other in the height direction is effective. In addition, the two operating cables 56 and 60, which do not intersect each other and are spaced from each other in the height direction, are easy to distinguish from each other when installed, which contributes to improvement in workability.

As shown in FIGS. 3 and 4, the portion of the open plate 20 in which the cable connection hole 20b is formed and the cable connecting portion 30d of the second lever 30 are formed at different positions in the height direction with respect to the lower bracket 11; specifically, the cable connection hole 20d is formed at a position (high position) far from the base surface of the lower bracket 11, while the cable connection portion 30d is formed at a position (low position) close to the base surface of the lower bracket 11. In accordance with this positional relationship, the end 58a of the operating cable 58 and the end 62a of the operating cable 62 are mutually different in position in the height direction.

As shown in FIGS. 3 and 18, the cable support grooves 40i and 40j of the first bracket 40 are grooves each of which is elongated in a direction substantially orthogonal to the height direction. The end of each cable support groove 40i and 40j on the base end side of the side plate 40h, which is close to the leg portion 40b, is closed to be formed as the bottom of the groove, while the other end of each cable support groove 40i and 40j on the outer end side (the lower-right side with respect to FIG. 18) of the side plate 40h, which is far from the leg portion 40b, is formed as an open end. The cable support grooves 40i and 40j are formed side by side on the side plate 40h at different positions in the height direction. The cable support groove 40i is formed at a position (high position) far from the seating portion 40d and the cable support groove 40j is formed at a position (low position) close to the seating portion 40d.

Accordingly, the link cable 58, which extends from the cable connection hole 20d to the cable support groove 40i (to the fitting portion 59a, which is fitted in the cable support groove 40i), and the slide-lock operating cable 62, which extends from the cable connection portion 30d to the cable support groove 40j (to the fitting portion 63a, which is fitted in the cable support groove 40j), are led to the first bracket 40 with the positional relationship (high-low relationship) between the cable connection hole 20d and the cable connection portion 30d in the height direction maintained, and arranged so as not to intersect each other in the height direction. According to this arrangement, the link cable 58 and the slide-lock operating cable 62 do not interfere with each other though positioned to intersect each other or lie close to each other when seen in a plan view as shown in FIGS. 5, 7, 9 and 11, which makes it possible to increase the degree of freedom in arrangement of the link cable 58 and the slide-lock operating cable 62. In addition, the link cable 58 and the slide-lock operating cable 62, which do not intersect each other and are spaced from each other in the height direction, are easy to distinguish from each other when installed, which contributes to improvement in workability.

Figure 22:
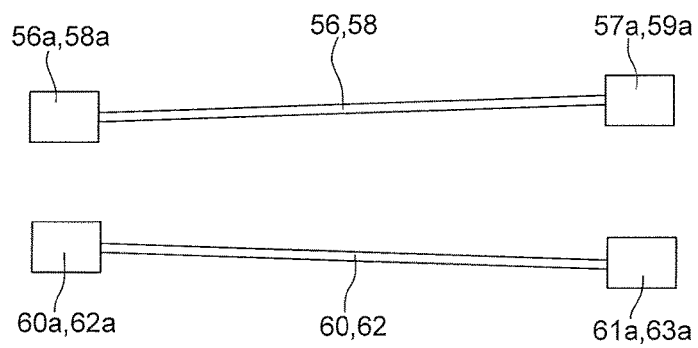
FIG. 22 is a diagram schematically showing the arrangement of two cables in the height direction (which corresponds to the widthwise direction of the vehicle seat) which are provided in the seat reclining apparatus.

FIG. 22 schematically shows the positional relationship between the two cables (the operating cable 56 and the link cable 58) in the height direction which are supported by the second bracket 49 and the positional relationship between the two cables (the operating cable 60 and the slide-lock operating cable 62) in the height direction which are supported by the first bracket 40. In regard to the operating cables 56 and 60, the distance in the height direction between the fitting portion 57a and the fitting portion 61a, which are respectively supported by the second bracket 49 at the cable support groove 49c and the cable support groove 49d, is greater than that between the end 56a of the operating cable 56 and the end 60a of the operating cable 60, which are respectively supported by the open plate 20 and the first lever 21 at the cable connection hole 20b and the cable connection portion 21d, respectively. Therefore, the distance in the height direction between the operating cable 56 and the operating cable 60 progressively increases in the direction toward the side on which the cable support grooves 49c and 49d are formed from the side on which the cable connection hole 20b and the cable connection portion 21d are formed. Likewise, in regard to the link cable 58 and the slide-lock operating cable 62, the distance in the height direction between the fitting portions 59a and 63a, which are respectively supported by the first bracket 40 at the cable support grooves 40i and 40j, is greater than that between the end 58a of the link cable 58 and the end 62a of the slide-lock operating cable 62, which are respectively supported by the open plate 20 and the second lever 30 at the cable connection hole 20d and the cable connection portion 30d. Therefore, the distance in the height direction between the link cable 58 and the slide-lock operating cable 62 progressively increases in the direction toward the side on which the cable support grooves 40i and 40j are formed from the side on which the cable connection hole 20d and the cable connection portion 30d are formed.

Figure 23:
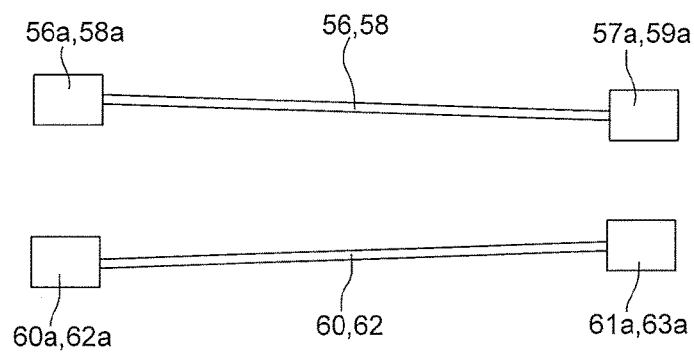
FIG. 23 is a diagram schematically showing another embodiment of the arrangement of the two cables in the height direction.
Figure 24:
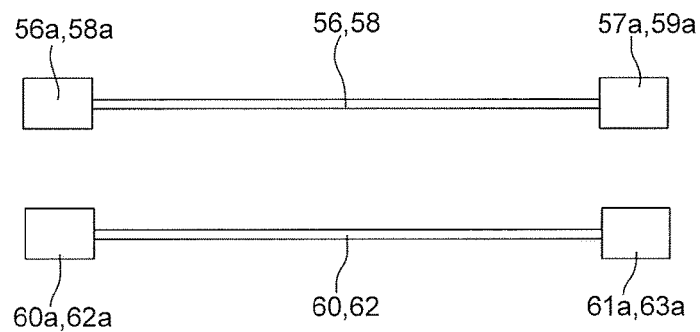
FIG. 24 is a diagram schematically showing yet another embodiment of the arrangement of the two cables in the height direction.

It is also possible to set the positional relationship between each set of two cables (56 and 58, 60 and 62) in the height direction as shown in FIGS. 23 and 24, unlike that shown in FIG. 22. FIG. 23 shows another embodiment of the arrangement of each set of two cables in the height direction in which the distance in the height direction between the operating cable 56 and the operating cable 60 (between the link cable 58 and the slide-lock operating cable 62) progressively decreases in the direction toward the side on which the cable support grooves 49c and 49d (the cable support grooves 40i and 40j) are formed from the side on which the cable connection hole 20b and the cable connection portion 21d (the cable connection hole 20d and the cable connection portion 30d) are formed. FIG. 24 shows yet another embodiment of the arrangement of each set of two cables in the height direction in which the distance in the height direction between the operating cable 56 and the operating cable 60 (the link cable 58 and the slide-lock operating cable 62) is substantially constant over the range from the cable connection hole 20b and the cable connection portion 21d (the cable connection hole 20d and the cable connection portion 30d) to the cable support groove 49c and the cable support groove 49d (the cable support groove 40i and the cable support groove 40j).

The embodiment shown in FIG. 22 has the advantage that each cable 56, 58, 60 and 62 (each fitting portion 57a, 59a, 61a and 63a) can be easily installed to the first bracket 40 and the second bracket 49 since the relative position between the two cable guides of each set (the two cable guides 57 and 61, and the two cable guides 59 and 63) can be easily set to increase the distance between the two cable guides of each set (the two cable guides 57 and 61, and the two cable guides 59 and 63) that are fixed to a common bracket (the first bracket 40 or the second bracket 49).

The embodiment shown in FIG. 23 has the advantage that each cable 56, 58, 60 and 62 does not easily interfere with the adjacent cable 60, 62, 56 or 58 at a position in the vicinity of the end 56a, 58a, 60a or 62a, respectively, when the open plate 20, the first lever 21 and the second lever 30 rotate.

According to the embodiment shown in FIG. 24, a drive performance with great efficiency can be achieved by reducing the power loss when a drive force is transmitted via each cable 56, 58, 60 and 62 by providing each cable 56, 58, 60 and 62 so that it extends in a direction substantially orthogonal to the rotation centers of the open plate 20, the first lever 21 and the second lever 30.

Any of the above illustrated embodiments shown in FIGS. 22 through 24 can be achieved by appropriately setting the positional relationships between the cable support grooves 40i and 40j of the first bracket 40 and between the cable support grooves 49c and 49d of the second bracket 49 in accordance with the positional relationship between the cable connection portions of the open plate 20, the first lever 21 and the second lever 30 in the height direction.

The shape of grooves like that of the cable support grooves 40i and 40j on the first bracket 40 and the cable support grooves 49c and 49c on the second bracket 49 is desirable because such a shape facilitates the cable insertion operation which is performed when each cable (each fitting portion thereof) is inserted into the associated groove to be supported therein, and is superior in productivity and production cost when the cable support grooves 40i and 40j and the cable support grooves 49c and 49d are formed on the first bracket 40 and the second bracket 49, respectively. However, it is also possible to adopt a cable support portion(s) having a configuration other than that of a groove (e.g., a hook-shaped portion formed by lancing or bending part of a bracket, or a through-hole formed in a bracket).

Although each of the first bracket 40 and the second bracket 49 of the present embodiment supports two cables, a different configuration in which a single cable support member supports more than two cables is also possible. For instance, unlike the present embodiment, in the case where the cable connection portion 30d of the second lever 30 is positioned close to the cable connection portion 21d of the first lever 21, it is also possible to make the second bracket 49 support the link cable 58 in addition to the operating cables 56 and 60. In this case, the second bracket 49 supports the three operating cables 56, 58 and 60 so that the three operating cables 56, 58 and 60 are mutually different in position in the height direction and do not intersect one another in the height direction.

Operations of the seat reclining apparatus 10, constructed as described above, will be discussed hereinafter. FIGS. 5 and 6 show the seat reclining apparatus 10 in a seating position in a state where the seatback 5 is in the reclining range R (at an angle close to the angle of the initial lock position 5A shown in FIG. 1). At this time, the lock release handle 6 is held in the initial position by the biasing force of the torsion spring 48, and the reclining lock mechanism 14(71) is in a locked state, in which the reclining lock mechanism 14(71) fixes the angle of the upper bracket 12 (the seatback 5) and prevents the upper bracket 12 (the seatback 5) from tilting. In accordance with this locked state of the reclining lock mechanism 14(71), the open plate 20(70) is in the locked position. The second lever 30 and the cancel lever 31 are held in the latching position and the neutral position, respectively, by the biasing force of the torsion spring 33. The spring hook portion 30e of the second lever 30 and the lanced lug lie of the lower bracket 11, which are held between the pair of spring ends of the torsion spring 33, are positioned to overlap each other. The hook portion 30c of the second lever 30 in the latching position is positioned on the movement path of the link pin 23, so that the first lever 21 is held in the restriction release position against the biasing force of the extension coil spring 26. Since the biasing force of the torsion spring 33, which biases the second lever 30 is set greater than the biasing force of the extension coil spring 26, which biases the first lever 21, the holding of the first lever 21 in the restriction release position by the second lever 30 is maintained. In addition, the presence of the second lever 30 in the latching position does not cause the slide lock mechanism 3 to perform the slide-lock release operation (an operation to cause the pair of upper rails 2b to transition to the slide allowing state) via the slide-lock operating cable 62. As shown in FIG. 6, the control projection 25, which is provided on the upper bracket 12, is spaced from each of the cancel lever 31 and the stopper pin 24, so that the control projection 25, the cancel lever 31 and the stopper pin 24 are positioned in that order from the vehicle front side.

Manually rotating the lock release handle 6 in the pulling direction (the counterclockwise direction with respect to FIG. 5 and the clockwise direction with respect to FIG. 6) from the initial position against the biasing force of the torsion spring 48 causes the open plate 20 to rotate to the lock release position from the lock position (in the counterclockwise direction with respect to FIG. 5) via the connecting rod 55, thus causing the reclining lock mechanism 14 to transition to an unlocked state. Additionally, the open plate 70 rotates in association with this rotation of the open plate 20 via the link cable 58, which causes the reclining lock mechanism 71 to transition to an unlocked state. The lock release handle 6 can be rotated in the pulling direction to the position (shown in FIG. 7) at which the medium-diameter 44b of the guide pin 44 comes into contact with the end portion 41e-2 of the circular arc hole 41e. At this stage, releasing the lock release handle 6 after adjusting the angle of the seatback 5 within the reclining range R by an external force such as a manual force causes the reclining lock mechanism 14 to return to a locked state, which makes it possible to fix the angle of the seatback after adjustment.

Upon the reclining lock mechanism 14(71) transitioning to an unlocked state as a result of the rotation of the open plate 20(70) from the lock position to the lock release position, the vehicle seat 1 transitions to a so-called wall-in state unless the seatback 5 is held by an external force such as a manual force. When the vehicle seat 1 transitions to this wall-in state, the seatback 5 tilts forward into the unlock range U, which is set closer to the vehicle front side than the reclining range R, by the biasing force of the forward-tilt biasing spring 16, while the slide-locked state by the slide lock mechanism 3 is released (i.e., the vehicle seat 1 transitions from the slide-locked state to the slide allowing state).

The rotation of the open plate 20 to the lock release position when the vehicle seat 1 (the seat reclining apparatus 10) is brought into a walk-in state can be carried out by operating either the lock release handle 6 or the walk-in lever 7. When the lock release handle 6 is operated, this operating force is transmitted to the open plate 20 via the connecting rod 55 as described above. When the walk-in lever 7 is operated, this operating force is transmitted to the open plate 20 via the operating cable 56. In either case, the open plate 20 rotates from the lock position to the lock release position, which causes the reclining lock mechanism 14 to transition from a locked state to an unlocked state, thereby causing the upper bracket 12 to tilt forward with respect to the lower bracket 11 by the biasing force of the biasing spring 16.

Upon the upper bracket 12 tilting forward a predetermined amount in the unlock range U, the control projection 25 approaches and comes into contact with the pressed projection 31c of the cancel lever 31. At this time, the first pressing surface 25a of the control projection 25 abuts against the side surface 31d of the cancel lever 31 (a portion of the cancel lever 31 which is close to the curved tip surface 31f), which allows a force of the upper bracket 12 in the rotational direction thereof to be transmitted to the cancel lever 31. The biasing force of the forward-tilt biasing spring 16 which acts on the upper bracket 12 to tilt the upper bracket 12 forward is set greater than the biasing force of the torsion spring 33 which biases the cancel lever 31 to the neutral position, and the control projection 25 presses the cancel lever 31 against the biasing force of the torsion spring 33 to rotate the cancel lever 31 from the neutral position (shown in FIG. 6) toward the first free-swing position (shown in FIG. 8) (in the clockwise direction with respect to FIG. 6).

Upon the cancel lever 31 rotating to the first free-swing position from the neutral position, the second lever 30, which rotates with the cancel lever 30, rotates to the unlatching position (shown in FIG. 7) from the latching position (shown in FIG. 5) (in the counterclockwise direction with respect to FIG. 5). This rotation of the second lever 30 causes the spring hook portion 30e to press and move one end of the torsion spring 33 as shown in FIGS. 7 and 8, thereby charging the torsion spring 33 so that it accumulates energy (biasing force). Upon the second lever 30 rotating to the unlatching position, the hook portion 30c retreats from the movement path of the link pin 23 (the link pin 23 is disengaged from the recessed portion 30f) to thereby release the restrictions on rotation of the first lever 21, which causes the first lever 21 to rotate to the forward-tilt restriction position (shown in FIG. 7) from the forward-tilt release position (shown in FIG. 5) (in the clockwise direction with respect to FIG. 5) by the biasing force of the extension coil spring 26. Upon the first lever 21 reaching the forward-tilt restriction position, the stopper pin 24 moves onto the movement path of the control projection 25, and the first pressing surface 25a of the control projection 25 abuts against the stopper pin 24 as shown in FIG. 8, thereby preventing the upper bracket 12 from tilting forward. The angular position of the seatback 5 at this time corresponds to the intermediate stop position 5B (shown in FIG. 1).

To cause the upper bracket 12 to stop at the position shown in FIGS. 7 and 8 with reliability via the stopper pin 24, the operation timing has to be set so that the first lever 21 reaches the forward-tilt restriction position before the control projection 25 passes through the angular position thereof at which the control projection 25 overlaps the circular arc hole 11c of the lower bracket 11. When the first lever 21 is in the restriction release position and the second lever 30 is in the latching position as shown in FIG. 5, a predetermined length is secured from the point on the hook portion 30c at which the link pin 23 abuts against the contact edge 30g to the tip of the hook portion 30c of the second lever 30, and accordingly, there is a time lag from the moment at which the cancel lever 31 receives a pressure from the control projection 25 to the moment at which the stopper pin 24 moves onto the movement path of the control projection 25 (the first lever 21 reaches the front-tilt limit position) following the release of the latched condition of the link pin 23 by the hook portion 30c of the second lever 30. If the length of the hook portion 30c which corresponds to the aforementioned predetermined length is reduced, the timing of the commencement of rotation of the first lever 21 toward the forward-tilt restriction position becomes earlier. However, if the length of the hook portion 30c is excessively shortened, the risk of the link pin 23 being accidentally disengaged due to precision error, a shock given from the outside, etc. increases in the state shown in FIG. 5, in which the second lever 30 is in the latching position. The length and angle of the hook portion 30c of the second lever 30 in the present embodiment of the seat reclining apparatus 10 are predetermined to make the first lever 21 rotate to the forward-tilt restriction position at an optimum timing with no delay while preventing the link pin 23 from being irregularly disengaged from the hook portion 30c.

In addition, when the second lever 30 rotates from the latching position to the unlatching position, the slide-lock operating cable 62 is pulled to release the slide lock of the slide lock mechanism 3 (i.e., to perform the aforementioned slide-lock release operation to cause the pair of upper rails 2b to transition to the aforementioned slide allowing state). When the upper bracket 12 is at the angular position at which the first pressing surface 25a of the control projection 25 abuts against the stopper pin 24 (i.e., when the seatback 5 is at the intermediate stop position 5B), a portion of the pressed projection 31c in the vicinity of the tip thereof (a portion of the pressed projection 31c in the vicinity of the boundary between the side surface 31d and the curved tip surface 31f) abuts against the peripheral curved surface 25c of the control projection 25 as shown in FIG. 8, which prevents the cancel lever 31 from returning to the neutral position, so that the cancel lever 31 is held in the first free-swing position. Therefore, when the seatback 5 is at the intermediate stop position 5B, the second lever 30 is held in the unlatching position, and the state in which the slide-lock operating cable 62 is pulled is maintained.

The vehicle seat 1 is brought into a walk-in state, in which passengers can easily enter and exit from the rear space (rear passenger seat) in the back of the vehicle seat 1, by tilting the seatback 5 forward into the unlock range U, which is set closer to the vehicle front side than the reclining range R, and unlocking the slide lock of the seat track (the slide lock mechanism 3). The strength of the seat slide spring(s) (not shown) which biases and slides the vehicle seat 1 forward can be set at a level capable of either sliding the vehicle seat 1 forward automatically upon release of the slide lock of the seat track, or assisting forward sliding movement of the vehicle seat 1 when one manually slides the vehicle seat 1 forward (i.e., at a level incapable of sliding the vehicle seat 1 solely by the biasing force of the aforementioned seat slide spring (not shown)).

The walk-in state shown in FIGS. 7 and 8 is maintained even when one stops operating to release the lock release handle 6 or the walk-in lever 7. Immediately after one stops pulling to release the lock release handle 6, the lock release handle 6 returns to the initial position (shown in FIG. 5) by the biasing force of the torsion spring 48. Immediately after one stops operating to release the walk-in lever 7, the operating cable 56 becomes loose. In accordance with this, the reclining lock mechanism 14 operates in a direction to return to a locked state while rotating the open plate 20 in the counterclockwise direction with respect to FIG. 7. However, since the reclining lock mechanism 14 is provided with a gear-engagement restriction portion (not shown) which restricts engagement between the radially outer teeth on the each lock member and the radially inner teeth on the ratchet plate 14b when the seatback 5 is in the unlock range U, the seatback 5 is not locked by the reclining lock mechanism 14 in the walk-in state shown in FIGS. 7 and 8.

To cancel the walk-in state shown in FIGS. 7 and 8 to bring the vehicle seat reclining apparatus 10 back to a seating position, the seatback 5 is manually raised from the intermediate stop position 5B. This operation to raise the seatback 5 causes the upper bracket 12 to rotate in the direction to move the control projection 25 away from the cancel lever 31 (to disengage the control projection 25 from the cancel lever 31), and thereupon, the biasing force of the torsion spring 33 causes the second lever 30 to return to the latching position (shown in FIG. 5) from the unlatching position (shown in FIG. 7) and causes the cancel lever 31 to return to the neutral position (shown in FIG. 6) from the first free-swing position (shown in FIG. 8). In addition, when the second lever 30 returns to the latching position, the linear contact edge 30g of the hook portion 30c comes into contact with the link pin 23 and subsequently rotates the first lever 21 from the forward-tilt restriction position (shown in FIG. 7) to the restriction release position (shown in FIG. 5) while pulling the link pin 23 in the recessed portion 30f. Subsequently, upon the seatback 5 being raised to the initial lock position 5A, the reclining lock mechanism 14 returns to a locked state, thereby fixing the angle of the seatback 5, so that the seat reclining apparatus 10 returns to the state shown in FIGS. 5 and 6.

Manually operating the seatback fold-down lever 8 in the walk-in state shown in FIGS. 7 and 8 causes the operating cable 60 to be pulled, thereby causing the first lever 21 to rotate from the forward-tilt restriction position to the restriction release position (in the counterclockwise direction with respect to FIG. 7). Thereupon, the stopper pin 24, which is attached to the first lever 21, retreats downward from the position at which the stopper pin 24 is in contact with the control projection 25 of the upper bracket 12, which allows the upper bracket 12 to tilt further forward, without being restricted by the stopper pin 24. This makes it possible to tilt the seatback 5 forward beyond the intermediate stop position 5B.

Folding the seatback 5 down to the folded-down position 5C (shown FIG. 1) causes the seat reclining apparatus 10 to transition to a folded-down state (shown in FIGS. 9 and 10). As a result that the seatback 5 tilts forward from the intermediate stop position 5B, the control projection 25 of the upper bracket 12 has passed through the position at which the control projection 25 presses the pressed projection 31c of the cancel lever 31, while the cancel lever 31 which has been released from being pressed by the control projection 25 has returned to the neutral position from the first free-swing position by the biasing force of the torsion spring 33 as shown in FIG. 10. When the control projection 25 moves to the position shown in FIG. 10 from the position (shown in FIG. 8) at which the control projection 25 contacts the pressed projection 31c of the cancel lever 31, the peripheral curved surface 25c of the control projection 25 and a portion of the cancel lever 31 in the vicinity of the curved tip surface 31f thereof come into contact with each other, so that the control projection 25 can smoothly climb over the cancel lever 31.

In addition, following the passage of the control projection 25, the second lever 30 returns to the latching position from the unlatching position by the biasing force of the torsion spring 33, so that the first lever 21 is held in the restriction release position by the hook portion 30c as shown in FIG. 9. Additionally, the return of the second lever 30 to the latching position causes the pulled state of the slide-lock operating cable 62 to be released, thus causing the slide lock mechanism 3 to transition to the slide-locked state, in which the pair of upper rails 2b is prevented from sliding relative to the pair of lower rails 2a. Accordingly, when the seatback 5 is brought to the folded-down position 5C, the position of the vehicle seat 1 in the forward and rearward directions is fixed.

When the seatback 5 is raised from the folded-down position 5C, the control projection 25 of the upper bracket 12 firstly passes through the angular position thereof at which the control projection 25 overlaps the circular arc hole 11c of the lower bracket 11, and subsequently approaches the cancel lever 31, in inverse order to that in which the seatback 5 is tilted forward. At this stage, the first lever 21 is held in the restriction release position, so that the control projection 25 of the upper bracket 12 can pass through the angular position thereof at which the control projection 25 overlaps the circular arc hole 11c of the lower bracket 11, without being interrupted by the stopper pin 24. There is provided a clearance between the stopper pin 24 and the lower end of the circular arc hole 11c in a state where the link pin 23 is in contact with the contact edge 30g of the hook portion 30c as shown in FIGS. 9 and 10, and the first lever 21, to which the link pin 23 is fixed, is given a range of movement corresponding to the amount of that clearance at the restriction release position of the first lever 21. Therefore, when the control projection 25 passes through the angular position thereof at which the control projection 25 overlaps the circular arc hole 11c of the lower bracket 11, the control projection 25 can move while depressing the stopper pin 24 with the peripheral curved surface 25c abutting against the stopper pin 24 (while slightly rotating the first lever 21 in the restriction release position). Additionally, since the second pressing surface 25b of the control projection 25 is provided with a predetermined angle of inclination, the control projection 25 can depress the stopper pin 24 even when the second pressing surface 25b, not the peripheral curved surface 25c, comes into contact with the stopper pin 24. Accordingly, in an operation to raise the seatback 5 from the folded-down position 5C, the seatback 5 is not prevented from tilting even when the control projection 25 comes into contact with the stopper pin 24.

Since the cancel lever 31 is in the neutral position when the seatback 5 is in the folded-down position 5C as shown in FIG. 10, tilting the upper bracket 12 by an operation to raise the seatback 5 from the folded-down position 5C causes the control projection 25 to come into contact with the pressed projection 31c, specifically causes the second pressing surface 25b of the control projection 25 to come into contact with the side surface 31e of the pressed projection 31c of the cancel lever 31. In this state, further tilting the upper bracket 12 in the same direction to raise the seatback 5 causes the cancel lever 31 to be pressed in the counterclockwise direction from the neutral position against the biasing force of the torsion spring 33 to thereby rotate to the second free-swing position, shown in FIG. 12.

With the rotation of the cancel lever 31 to the second free-swing position, the second lever 30 rotates from the latching position to the over-latching position, shown in FIG. 11. As described above, a predetermined length is secured from the point on the hook portion 30c at which the link pin 23 abuts against the contact edge 30g to the tip of the hook portion 30c of the second lever 30 when the first lever 21 and the second lever 30 are in the restriction release position and the latching position, respectively, (shown in FIGS. 5 and 9); in this state shown in FIGS. 5 and 9, a predetermined length is further secured from the point on the hook portion 30c at which the link pin 23 abuts against the contact edge 30g to the base end of the hook portion 30c (to the deepest portion of the recessed portion 30f). In other words, the link pin 23 is in contact with a portion of the hook portion 30c (the contact edge 30g) in the vicinity of the center thereof in the longitudinal direction. Thereafter, rotation of the second lever 30 from the latching position (shown in FIGS. 5 and 9) to the over-latching position (shown in FIG. 11) causes the link pin 23 to move to a position in the close vicinity of the deepest portion of the recessed portion 30f while remaining in contact with the contact edge 30g. As described above, the second lever 30 is shaped to make the contact edge 30g and the link pin 23 keep contacting each other during the rotation from the latching position (shown in FIGS. 5 and 9) to the over-latching position (shown in FIG. 11), and the first lever 21 continues to be held in the restriction release position when the second lever 30 is in the over-latching position. Additionally, since the slide-lock operating cable 62 is not pulled by the rotation of the second lever 30 to the over-latching position, the slide-locked state by the slide lock mechanism 3 is maintained. The rotation of the second lever 30 to the over-latching position causes the spring hook portion 30e to press and move one end of the torsion spring 33 as shown in FIGS. 11 and 12, thereby charging the torsion spring 33 so that it accumulates energy (biasing force).

FIG. 12 shows a state where a portion of the control projection 25 in the vicinity of the boundary between the first pressing surface 25a and the peripheral curved surface 25c abuts against the curved tip surface 31f of the cancel lever 31 in the second free-swing position. Further tilting of the upper bracket 12 in the direction to raise the seatback 5 from the state shown in FIG. 12 (in the clockwise direction with respect to FIG. 12) causes the control projection 25 to climb over the pressed projection 31c of the cancel lever 31 and subsequently move away from the cancel lever 31. Thereupon, the cancel lever 31 returns to the neutral position by the biasing force of the torsion spring 33, and the second lever 30 returns to the latching position. Subsequently, upon the seatback 5 being further raised to the initial locked position 5A, the reclining lock mechanism 14 transitions to a locked state to fix the angle of the seatback 5 (the upper bracket 12), thus the seat reclining apparatus 10 returning to the state shown in FIGS. 5 and 6.

As described above, the seat reclining apparatus 10 can be brought into the walk-in state shown in FIGS. 7 and 8 or the folded-down state shown in FIGS. 9 and 10 from the seating state shown in FIGS. 5 and 6. The second lever 30 allows the first lever 21 to rotate from the restriction release position to the forward-tilt restriction position immediately before the seatback 5 reaches the intermediate stop position 5B in the unlock range U from the reclining range R, and the second lever 30 holds the first lever 21 in the restriction release position in other states. Therefore, after the seatback 5 is tilted forward to a point (e.g., to the folded-down position 5C) beyond the intermediate stop position 5B, which is the angular position of the seatback 5 in the walk-in state shown in FIGS. 7 and 8, by rotating the first lever 21 from the forward-tilt restriction position to the restriction release position, the first lever 21 does not return to the forward-tilt restriction position during an operation to raise the seatback 5. For instance, in the case where one releases his or her hand from the seatback 5 in the middle of raising the seatback 5 from the folded-down position 5C to the initial lock position 5A, the seatback 5 can return to the folded-down position 5C without being stopped at the intermediate stop position 5B by the stopper pin 24. Accordingly, when the seat reclining apparatus 10 is caused to transition from a walk-in state (shown in FIGS. 7 and 8) to the folded-down state (shown in FIGS. 9 and 10) by manually operating the seatback fold-down lever 8, if an operation to temporarily raise the seatback 5 halfway to correspond to an accident such that a foreign object gets caught in between the seatback 5 and the seat cushion 4, the seatback 5 can subsequently be folded down to the folded-down position 5C without making the seatback 5 come to a halt at the intermediate stop position 5B (with no need to operate the seatback fold-down lever 8 again), which makes it possible to prevent the operation of the seat reclining apparatus 10 from becoming complicated.

The operation of the seatback 5 that has been described above is achieved by a simple structure in which the first lever 21 and the second lever 30 are made as main elements of the seat reclining apparatus 10. More specifically, the position of the first lever 21 can be controlled by a simple structure such that the second lever 30 brings the link pin 23 into and out of the recessed portion 30f (brings the hook portion 30c onto and out of the movement path of the link pin 23) by rotating forward and reverse. In addition, the second lever 30 has not only the capability of controlling the position of the first lever 21 and also the capability of performing the slide-lock release operation to release the lock of the slide lock mechanism 3, and the seat reclining apparatus 10 and the slide lock mechanism 3 can be made associated with each other to cause the vehicle seat 1 to transition to a walk-in state (walk-in position).

Since the contact edge 30g of the second lever 30 has a linear (planar) shape which generally confronts the moving direction of the link pin 23 (the movement path of the link pin 23) about the shaft portion 22 (generally confronts the rotational direction of the first lever 21) in a state where the contact edge 30g abuts against the link pin 23 as shown in FIGS. 5, 9 and 11, the link pin 23 can be brought to a stop with reliability. Additionally, in a state where the link pin 23 is in contact with the contact edge 30g, the contact point between the link pin 23 and the contact edge 30g, the link pin 23 (the axis of the link pin 23) and the shaft portion 32 (the rotation center of the second lever 30) are substantially aligned, which enables the shaft portion 32 to receive a force from the link pin 23 while causing the second lever 30 to produce almost no component force with respect to the rotational direction of the second lever 30. Due to such configurations, the second lever 30 has excellent performance in latching the first lever 21.

The first lever 21 has the link pin 23 at a middle point in the radial direction which connects the shaft member 22, which is the rotation center of the first lever 21, and the stopper pin 24, which comes in contact with the control projection 25 of the upper bracket 12, and accordingly, the first lever 21 can be latched by the second lever 30 with a space-saving structure. In addition, the arrangement in which the link pin 23, which is provided at a position closer to the shaft portion 22 than the stopper pin 24, is made as a contact portion with the second lever 30 reduces the load on the second lever 30 when the second lever 30 latches the first lever 21 in the restriction release position, which makes it possible to enhance operating efficiency.

The shaft hole 21a of the first lever 21, into which the shaft member 22 is fitted so that the first lever 21 is pivotally supported by the shaft member 22, is in the shape of an oval the large diameter of which extends in a direction toward the position at which the stopper pin 24 is provided, which allows the position of the shaft hole 21a with respect to the shaft member 22 to be adjusted. This makes it possible to set the timing and the position at which the stopper pin 24 comes into contact with the control projection 25 of the upper bracket 12 with high precision.

In the seat reclining apparatus 10, the support structure for the lock release handle 6, provided as an operating member, is such that a combination of the lock release handle 6 and the handle fastening member 42 (hereinafter referred to as the seat-reclining operating device) is rotatably supported to a combination of the first bracket 40 and the support guide plate 41 (hereinafter referred to as the supporter) that is fixedly supported by the lower bracket 11. The pivotal support mechanism which supports the seat-reclining operating device (6 and 42) in a manner to allow the seat-reclining operating device (6 and 42) to rotate relative to the supporter (40 and 41) is configured of the shaft member 43 (specifically the medium-diameter portion 43b) and the shaft hole 42e of the handle fastening member 42, and the rotation restriction mechanism which determines the moving ends of the seat-reclining operating device (6 and 42) in the rotational direction thereof is configured of the guide pin 44 (specifically the medium-diameter portion 44b) and the circular arc hole 41e (specifically the ends 41e-1 and 41e-2). In addition, the shaft member 43, which is an element of pivotal support mechanism, and the guide pin 44, which is an element of the rotation restriction mechanism, are equipped with an axial-direction holding portion (composed of the large-diameter portion 43a, the swaged portion 43d, the head 44a and the swaged portion 44d) that restricts movements of the seat-reclining operating device (6 and 42) in the direction along the rotation axis thereof (the axis of the shaft member 43) with respect to the supporter (40 and 41).

In the pivotal support mechanism, the support plate portion 40a of the first bracket 40, the flat plate portion 41a of the support guide plate 41 and the flat plate portion 42a of the handle fastening member 42, each of which is in the shape of a flat plate, are layered, and the shaft member 43 penetrates through this three-layered part of these three plate portions 40a, 41a and 42a as shown in FIG. 13. The shaft portion 43 is formed and installed so that the large-diameter portion 43a projects toward the seat outer side from the shaft hole 42e, which is formed in the flat plate portion 42a, and so that the small-diameter portion 43c projects toward the seat inner side through the shaft support holes 40f and 41c, which are formed in the support plate portion 40a and the flat plate portion 41a. In addition, the end surface (the aforementioned stepped portion provided at the boundary between the large-diameter portion 43a and the medium-diameter portion 43b) of the large-diameter portion 43a which projects toward the seat outer side is in contact with the flat plate portion 42a; the swaged portion 43d, which is formed at the end of the small-diameter portion 43c that projects toward the seat inner side, is in contact with the support plate portion 40a; and the support plate portion 40a and the flat plate portions 41a and 42a are sandwiched between the large-diameter portion 43a and the swaged portion 43d of the shaft member 43. With this structure, the flat plate portion 42a, which is provided on the seat-reclining operating device (6 and 42) side, is stably supported on the support plate portion 40a and the flat plate portion 41a, which are provided on the supporter side (40 and 41), with no rattling in the direction along the rotation axis of the seat-reclining operating device (6 and 42) (i.e., along the axis of the shaft member 43) (i.e., in the wall thickness direction of the support plate portion 40a and the flat plate portions 41a and 42a).

In the rotation restriction mechanism, the support plate portion 41a of the support guide plate 41 and the flat plate portion 42b of the handle fastening member 42, each of which is in the shape of a flat plate, are layered, and the guide pin 44 penetrates through the two-layered part of these two plate portions 41a and 42b as shown in FIG. 13. The guide pin 44 is formed and installed so that the head 44a projects toward the seat inner side from the circular arc hole 41e, which is formed in the flat plate portion 41a, and so that the small-diameter portion 44c projects toward the seat outer side through the guide pin mounting hole 42f, which is formed in the flat plate portion 42b. In addition, the end surface (the aforementioned stepped portion provided at the boundary between the head 44a and the medium-diameter portion 44b) of the head 44a which projects toward the seat inner side is in contact with the flat plate portion 41a; the swaged portion 44d, which is formed at the end of the small-diameter portion 44c that projects toward the seat outer side, is in contact with the flat plate portion 42b; and the flat plate portions 41a and 42b are sandwiched between the head 44a and the swaged portion 44d. With this structure, the flat plate portion 42b, which is provided on the seat-reclining operating device (6 and 42) side, is stably supported to the flat plate portion 41a, which is provided on the supporter side (40 and 41), with no rattling in the direction along the rotation axis of the seat-reclining operating device (6 and 42) (i.e., along the axis of the shaft member 43) (i.e., in the wall thickness direction of the flat plate portions 41a and 42b).

As described above, the seat-reclining operating device is improved in support strength and stability by providing each of the shaft member 43, which is an element of the pivotal support mechanism, and the guide pin 44, which is an element of the rotation restriction mechanism, with a structure which restricts movements of the seat-reclining operating device (6 and 42) in the direction along the rotation axis thereof (the axis of the shaft member 43) with respect to the supporter (40 and 41) and holds the seat-reclining operating device (6 and 42). Accordingly, it is possible to obtain the high-quality seat-reclining operating device which is unlikely to cause rattling and noise in the lock release handle 6.

In the pivotal support mechanism, the swaged portion 43d is formed on the side of the shaft member 43 which projects toward the seat inner side, and the swaged portion 43d abuts against the support plate portion 40a, which is an element of the supporter (40 and 41). On the other hand, in the rotation restriction mechanism, the swaged portion 44d is formed on the side of the guide pin 44 which projects toward the seat outer side, and the swaged portion 44d abuts against the flat plate portion 42b, which is an element of the seat-reclining operating device (6 and 42). By providing the swaged portion 43d of the shaft member 43 and the swaged portion 44d of the guide pin 44 so that the swaged portion 43d and the swaged portion 44d face in the opposite directions (i.e., toward the seat inner side and the seat outer side, respectively), far superior support accuracy and stability can be achieved. More specifically, in each of the shaft member 43 and the guide pin 44, one end thereof (the large-diameter portion 43a or the head 44a) on the opposite side from the other end at which the swaged portion (43d or 44d) is formed is greater in diameter and therefore has a greater strength than the swaged portion (43d or 44d); additionally, it is easy to set the surface accuracy of the contact portion at that end (the large-diameter portion 43a or the head 44a). Accordingly, with the arrangement in which the large-diameter portion 43a is positioned to face the seat outer side and the head 44a is positioned to face the seat inner side, the seat-reclining operating device (6 and 42) and the supporter (40 and 41) can be sandwiched from both sides with precision, which makes it possible to improve resistance to the load in the twisting direction which acts along the cross section shown in FIG. 13.

Although the swaged portions 43d and 44d are respectively formed on the shaft member 43 and the guide pin 44 to hold the seat-reclining operating device (6 and 42) and the supporter (40 and 41) in a direction along the rotation axis (the axis of the shaft member 43) of the seat-reclining operating device (6 and 42) in the above illustrated embodiment, any other holding structure other than the above illustrated holding structure using swaged portions can also be adopted. As an example, it is also adopt a configuration in which a screw member such as a screw nut or a fitting such as a snap ring is installed to each of the small-diameter portion 43c of the shaft member 43 and the small-diameter portion 44c of the guide pin 44 instead of forming each swaged portion (43d and 44d).

In the present embodiment of the seat reclining apparatus 10, various components are densely arranged on the lower bracket 11 because the seat reclining apparatus 10 performs complicated operations including the operation to bring the seat reclining apparatus 10 into a walk-in state and the operation to bring the seat reclining apparatus 10 into a folded-down state. The configuration in which the seat-reclining operating device is composed of two members: the lock release handle 6 and the handle fastening member 42 and the supporter is composed of the two members: the first bracket 40 and the support guide plate 41 enhances the degree of freedom in layout of the support structure for the lock release handle 6. For instance, the guide pin 44, the circular arc hole 41e and the end 55a of the connecting rod 55 nearly lie on the paths of the link cable 58 and the slide-lock operating cable 62 when the seat reclining apparatus 10 is seen in a plan view as shown in FIGS. 5, 7, 9 and 11. However, the guide pin 44, the circular arc hole 41e and the end 55a of the connecting rod 55 can be prevented from interfering with the link cable 58 and the slide-lock operating cable 62 by positioning the support guide plate 41, the handle fastening member 42 and the lock release handle 6 at positions spaced from the lower bracket 11 as shown in FIG. 3. As shown in FIG. 18, each of the leg portions 40b and 40c of the first bracket 40 includes curved portions, thus having a high-rigidity shape, and is superior in support strength while enhancing the degree of freedom in layout.

In the case where no restrictions are imposed on the arrangement of the components on the lower bracket 11, each of the seat-reclining operating device and the supporter can consist of a single member. Alternatively, each of the seat-reclining operating device and the supporter can be made of a combination of more than two members.

The first bracket 40 has the capability of supporting the fitting portion 59a of the cable guide 59 and the fitting portion 63a of the cable guide 63 via the cable support grooves 40i and 40j in addition to the above illustrated capability of serving as a spacer for the support guide plate 41 and the handle fastening member 42. Depending on the routing direction of the link cable 58 and the slide-lock operating cable 62, each of the link cable 58 and the slide-lock operating cable 62 can also be routed through the space secured by the first bracket 40 (i.e., the space surrounded by the leg portions 40b and 40c of the support plate 40a and the lower bracket 11), unlike the configuration illustrated above.

As shown in FIG. 19, each end portion 41e-1 and 41e-2 of the circular arc hole 41e, which is formed in the support guide plate 41, has a linear (planar) shape extending in a radial direction centered on the shaft bearing hole 41c. The shape of each end surface 41e-1 and 41e-2 of the circular arc hole 41e facilitates the accuracy control of the contact position with which the guide pin 44 comes in contact, and precisely determines the moving amount of the rotating operation of the lock release handle 6, shown in FIGS. 5 through 12, which makes it possible to improve the operating accuracy of the seat reclining apparatus 10. In addition, since each end surface 41e-1 and 41e-2 is a surface which confronts the movement path of the guide pin 44 (the rotational path centered on the shaft member 43), there is also a merit that no excessive component force does not easily occur when the guide pin 44 is brought into contact with either of the end portions 41e-1 and 41e-2.

In the handle fastening member 42, the rod mounting hole 42h, to which the connecting rod 55 is connected, is formed at a position closer to the shaft hole 42e than the guide pin mounting hole 42f in a radial direction centered on the shaft hole 42e, which is pivoted to the shaft member 43, as shown in FIG. 20. This arrangement makes it possible to obtain the effect of reducing the magnitude of the operating force per unit of angle of rotation of the lock release handle 6 when the open plate 20 is rotated via the connecting rod 55. In addition, by connecting the connecting rod 55 to that position (the guide pin mounting hole 42f) of the handle fastening member 42, a straight line which connects both ends 55a and 55b of the connecting rod 55 becomes nearly parallel to a straight line which connects the hinge pin 15 (the rotation center of the open plate 20) and the shaft member 43 (the rotation center of the handle fastening member 42) as shown in FIGS. 5 and 7. Accordingly, an efficient operation is achieved by reducing the power loss when a rotational operating force is transmitted from the lock release handle 6 to the open plate 20 via the connecting rod 55.

Although the present invention has been described based on the above illustrated embodiment, the present invention is not limited solely to this particular embodiment; various modifications to the above illustrated embodiment of the seat reclining apparatus are possible.

For instance, in the above illustrated embodiment, the first lever 21, which constitutes a stopper which stops the seatback 5 at the intermediate stop position 5B, and the second lever 30, which constitutes an element of a holding mechanism which holds the first lever 21 in the restriction release position, are each provided as a rotational member which rotates about the associated shaft member 22 or 32, which is substantially parallel to the rotation center 5x of the seatback 5; this configuration is superior in space saving. However, the present invention is achieved even in the case of using a stopper or a holding mechanism which operates in a different manner (e.g., operates by moving linearly) from a rotational member like the first lever 21 or the second lever 30 of the above illustrated embodiment.

In the above illustrated embodiment, the control projection 25 of the upper bracket 12 and the first lever 21 are separately arranged on the seat inner side and the seat outer side, respectively, with the lower bracket 11 positioned between the control projection 25 and the first lever 21; in accordance with this arrangement, the second lever 30 and the cancel lever 31, which are provided as separate members, are combined so as to rotate integrally. Unlike this configuration, the portions corresponding to the second lever 30 and the cancel lever 31 can also be formed into a single member in the case where the control projection 25 and the first lever 21 are collectively arranged on one side of the lower bracket 11.

As described above, the second lever 30 of the above illustrated embodiment of the seat reclining apparatus 10 has the capabilities of latching the first lever 21 in the restriction release position and releasing the lock of the slide lock mechanism 3, thus contributing to simplification of the structure of the seat reclining apparatus 10. However, it is also possible to select a different configuration in which the slide lock mechanism 3 is made to perform the slide-lock release operation using a different member from the second lever 30 when the seat reclining apparatus 10 is brought into the walk-in state shown in FIGS. 7 and 8.

In the above illustrated embodiment, the shaft hole 21a of the first lever 21 is formed into an elongated hole so that the positional error in the position at which the first lever 21 is supported with respect to the lower bracket 11 can be absorbed by adjusting the position of the shaft hole 21a relative to the circular cross-sectional portion 22a of the shaft member 22. Unlike this structure, it is also possible to form the shaft hole 21a of the first lever 21 into a simple circular hole having a diameter corresponding to the diameter of the circular cross-sectional portion 22a of the shaft member 22. In this case, it is advisable to make the position at which the first lever 21 is supported to the lower bracket 11 adjustable at a portion other than the shaft hole 21a and the shaft member 22.

Although the present embodiment of the seat reclining apparatus 10 is of a type capable of transitioning to a walk-in state in association with the slide-lock mechanism 3, the present invention is also applicable to a different type of seat reclining apparatus which does not operation in association with the slide-lock mechanism 3.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A seat reclining apparatus for a reclining seat including a seat cushion and a seatback,
    wherein, when a reclining mechanism of said seat reclining apparatus is provided between said seat cushion and said seatback, said seatback is supported to be capable of tilting forward and rearward relative to said seat cushion and has a moving range including: a lockable range, in which the reclining mechanism operates to allow an angle of said seatback relative to said seat cushion to be adjusted; and an unlock range in front of said lockable range, in which a non-operating state of said reclining mechanism is maintained, and
    wherein said seat reclining apparatus comprises:
    a stopper which is movable between a forward-tilt restriction position to stop said seatback at an intermediate stop position in said unlock range and a restriction release position to allow said seatback to tilt forward beyond said intermediate stop position, is situated at said forward-tilt restriction position when said seatback tilts toward said intermediate stop position from said lockable range side, and is movable from said forward-tilt restriction position to said restriction release position in a state where said seatback stops at said intermediate stop position; and
    a holding mechanism which keeps holding said stopper in said restriction release position until said seatback returns to said lockable range from a state where said seatback tilts forward beyond said intermediate stop position following a movement of said stopper from said forward-tilt restriction position to said restriction release position.

2. The seat reclining apparatus according to claim 1, further comprising a stopper biasing member which biases said stopper toward said forward-tilt restriction position, wherein said holding mechanism comprises:

a holding member which is movable between a first position and a second position, holds said stopper in said restriction release position when positioned in said first position, and allows said stopper to move to said forward-tilt restriction position when positioned in said second position; and a biasing member which biases said holding member toward said first position, wherein said holding member is in said first position when said seatback is in said lockable range, and wherein a pressing portion which moves with said seatback comes into contact with said holding member and moves said holding member from said first position to said second position in a middle of a tilting operation of said seatback from said lockable range to said intermediate stop position.

3. The seat reclining apparatus according to claim 2, further comprises a support member which is configured to be fixed to said seat cushion, wherein said stopper is supported by said support member to be rotatable about a rotational shaft parallel to a turning center of said seatback, wherein said stopper comprises: a held portion which comes into contact with said holding mechanism when held in said restriction release position; and a seatback stop portion which comes into contact with said seatback, to stop said seatback at said intermediate stop position when positioned in said forward-tilt restriction position, and wherein said held portion is closer than said seatback stop portion to said rotational shaft, wherein said holding member is supported by said support member to be rotatable about a second rotational shaft parallel to said turning center of said seatback between said second position and a third position which is located on the opposite side of said first position from said second position, wherein said held portion projects from said stopper in a direction along said rotational shaft, wherein said holding member comprises a recessed portion which is open in a rotational direction of said holding member about said second rotational shaft, wherein an inner edge of said recessed portion is positioned on a rotational path of said held portion which is centered on said rotational shaft to hold said stopper in said restriction release position when said holding member is in one of said first position and said third position, wherein said held portion is disengaged from said recessed portion to allow said stopper to rotate to said forward-tilt restriction position when said holding member is in said second position, wherein, upon said seatback tilting forward beyond said intermediate stop position, said pressing portion is disengaged from said holding member to thereupon cause said holding member to rotate from said second position to said first position by a biasing force of said biasing member, and wherein, when said seatback tilts to said lockable range from a position to which said seatback tilts forward beyond said intermediate stop position, said pressing portion comes into contact with and rotates said holding member from said first position to said third position, and is subsequently disengaged from said holding member to thereupon cause said holding member to rotate from said third position to said first position by said biasing force of said biasing member upon said seatback reaching.

4. The seat reclining apparatus according to claim 1, further comprises a support member which is configured to be fixed to said seat cushion, wherein said stopper is supported by said support member to be rotatable about a rotational shaft parallel to a turning center of said seatback, wherein said stopper comprises:

a held portion which comes into contact with said holding mechanism when held in said restriction release position; and a seatback stop portion which comes into contact with said seatback, to stop said seatback at said intermediate stop position when positioned in said forward-tilt restriction position, and wherein said held portion is closer than said seatback stop portion to said rotational shaft.

5. The seat reclining apparatus according to claim 4, wherein said rotational shaft comprises a circular cross sectional portion which projects from said support member, wherein said stopper has a shaft hole into which said circular cross sectional portion of said rotational shaft is inserted, and wherein said shaft hole of said stopper is shaped into a noncircular hole a large diameter of which extends in a direction toward a position at which said seatback stop portion is provided.

6. The seat reclining apparatus according to claim 1, wherein said reclining seat, which includes said seat cushion and said seatback, is supported on a seat track allowing said reclining seat to slide in forward and rearward directions, and wherein said seat track operates in association with a slide-lock mechanism which operates to switch between a slide-locked state, in which said slide-lock mechanism locks said seat track to prevent said reclining seat from sliding in said forward and rearward directions, and a slide allowing state, in which said slide-lock mechanism unlocks said seat track to allow said reclining seat to slide in said forward and rearward directions, and wherein said holding mechanism causes said slide lock mechanism to turn into said slide allowing state when said seatback tilts to said intermediate stop position from said lockable range.

* * * * *